(12) United States Patent
Ishida

(10) Patent No.: US 11,483,446 B2
(45) Date of Patent: Oct. 25, 2022

(54) IMAGE FORMING APPARATUS

(71) Applicant: Ricoh Company, Ltd., Tokyo (JP)

(72) Inventor: Masahiro Ishida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/326,894

(22) Filed: May 21, 2021

(65) Prior Publication Data

US 2021/0377418 A1 Dec. 2, 2021

(30) Foreign Application Priority Data

Jun. 1, 2020 (JP) .............................. JP2020-095255

(51) Int. Cl.
*H04N 1/32* (2006.01)
*H04N 1/00* (2006.01)
*G06F 3/12* (2006.01)

(52) U.S. Cl.
CPC ....... *H04N 1/32138* (2013.01); *G06F 3/1204* (2013.01); *G06F 3/1254* (2013.01); *H04N 1/00816* (2013.01); *H04N 1/00827* (2013.01); *G06F 3/1292* (2013.01)

(58) Field of Classification Search
None
See application file for complete search history.

(56) References Cited

U.S. PATENT DOCUMENTS

| | | | |
|---|---|---|---|
| 2007/0245913 A1* | 10/2007 | Sugiyama | B41J 3/44 101/288 |
| 2016/0142586 A1 | 5/2016 | Ishida et al. | |
| 2017/0277094 A1* | 9/2017 | Shimomura | G03G 15/167 |
| 2018/0191641 A1* | 7/2018 | Treue | H04L 49/602 |
| 2019/0370623 A1* | 12/2019 | Tsuchimoto | G06K 7/0008 |

FOREIGN PATENT DOCUMENTS

| | | |
|---|---|---|
| JP | 2002-337426 | 11/2002 |
| JP | 2006-103284 | 4/2006 |
| JP | 2007-295428 | 11/2007 |
| JP | 2007-300524 | 11/2007 |

* cited by examiner

*Primary Examiner* — Frantz Bataille
(74) *Attorney, Agent, or Firm* — Xsensus LLP

(57) ABSTRACT

An image forming apparatus includes an image reading unit configured to read an image formed on an object to be scanned, an image forming device configured to form an image on a printing object, a first processing unit configured to perform short-range radio communication to perform at least one of data reading operation from an information storage unit mounted on the object to be scanned and data writing operation to the information storage unit, and a second processing unit configured to perform short-range radio communication with the information storage unit mounted on the printing object to perform at least one of the data reading operation from the information storage unit and the data writing operation to the information storage unit. In the image forming apparatus, each one of the first processing unit and the second processing unit is configured to perform the short-range radio communication using a same antenna unit.

13 Claims, 10 Drawing Sheets

IMAGE FORMING APPARATUS

CROSS-REFERENCE TO RELATED APPLICATION

This patent application is based on and claims priority pursuant to 35 U.S.C. § 119(a) to Japanese Unexamined Patent Application No. 2020-095255, filed on Jun. 1, 2020, in the Japan Patent Office, the entire disclosure of which is hereby incorporated by reference herein.

BACKGROUND

Technical Field

Embodiments of the present disclosure relate to an image forming apparatus.

Background Art

In the related art, an image forming apparatus is known in the art that includes an image reading unit configured to read an image formed on an object to be scanned, an image forming device configured to form an image on a printing object, a first processing unit configured to perform short-range radio communication to perform at least one of data reading operation from an information storage unit mounted on the object to be scanned and the data writing operation to the information storage unit, and a second processing unit configured to perform short-range radio communication with the information storage unit mounted on the printing object to perform at least one of the data reading operation from the information storage unit and the data writing operation to the information storage unit.

For example, an image forming apparatus is known in the art that includes an electrophotographic image forming device and an image reading unit provided with a scanning carriage that scans the image on the document while moving along the platen glass on which an object to be scanned such as a document is placed. In such an image forming apparatus known in the art, an antenna unit such as a radio frequency (RF) reader, which performs short-range radio communication with from the information storage unit such as a radiofrequency identification (RFID) tag mounted on the document to read data from the information storage unit, is mounted on the scanning carriage of the image reading unit. Moreover, in such an image forming apparatus known in the art, an antenna unit such as a radio frequency (RF) writer, which performs the short-range radio communication with the information storage unit such as the RF ID tag mounted on the printing object such as a sheets of paper to write data to the information storage unit, is arranged downstream from the fixing device arranged inside the image forming device in the sheet conveyance direction.

SUMMARY

Embodiments of the present disclosure described herein provide an image forming apparatus including an image reading unit configured to read an image formed on an object to be scanned, an image forming device configured to form an image on a printing object, a first processing unit configured to perform short-range radio communication to perform at least one of data reading operation from an information storage unit mounted on the object to be scanned and data writing operation to the information storage unit, and a second processing unit configured to perform short-range radio communication with the information storage unit mounted on the printing object to perform at least one of the data reading operation from the information storage unit and the data writing operation to the information storage unit. In the image forming apparatus, each one of the first processing unit and the second processing unit is configured to perform the short-range radio communication using a same antenna unit. Alternatively, the image forming apparatus may further include a moving unit configured to be movable between a first communicating position at which the first processing unit performs the short-range radio communication and a second communicating position at which the second processing unit performs the short-range radio communication, and a plurality of antenna units mounted on the moving unit. In such an alternative image forming apparatus, the multiple antenna units are used by the first processing unit and the second processing unit to perform the short-range radio communication.

An image forming apparatus includes an image reading unit configured to read an image formed on an object to be scanned, an image forming device configured to form an image on a printing object, a first processing unit configured to perform short-range radio communication to perform at least one of data reading operation from an information storage unit mounted on the object to be scanned and data writing operation to the information storage unit, and a second processing unit configured to perform short-range radio communication with the information storage unit mounted on the printing object to perform at least one of the data reading operation from the information storage unit and the data writing operation to the information storage unit. In the image forming apparatus, each one of the first processing unit and the second processing unit is configured to perform the short-range radio communication using a same antenna unit.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
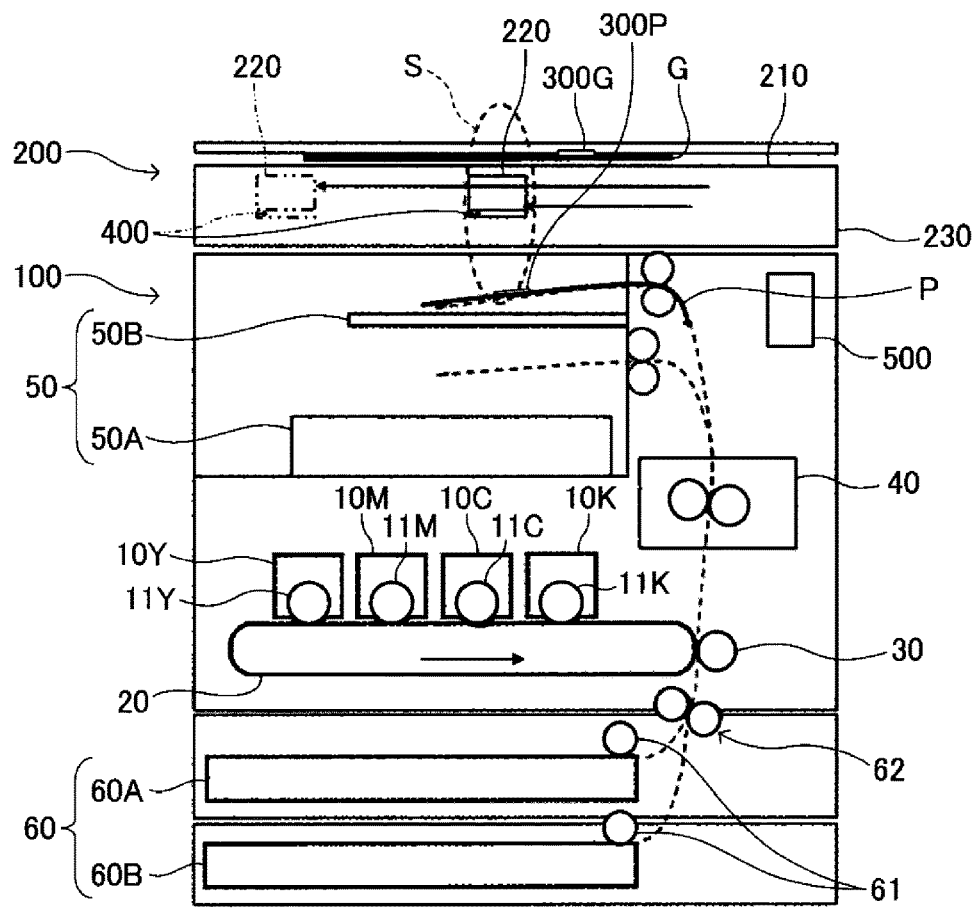
FIG. 1 is a schematic diagram illustrating an image forming apparatus provided with an image reading unit shaped like a flat plate, according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

An image forming apparatus according to an embodiment of the present disclosure is described below with reference to the drawings.

The image forming apparatus according to the present embodiment is provided with an electrophotographic image forming device. However, no limitation is indicated thereby, and the image forming apparatus according to the present embodiment may be provided with image forming device that adopts different image forming methods such as an inkjet printing system. The image forming apparatus according to the present embodiment is a tandem color image forming apparatus that adopts an intermediate transfer system in which the image forming device is provided with four photoconductors. However, no limitation is indicated thereby, and the image forming apparatus according to the present embodiment may be a monochrome image forming apparatus or a color image forming apparatus a color image forming apparatus that adopts different methods or systems.

First Embodiment

FIG. 1 is a schematic diagram illustrating an image forming apparatus in which an image reading unit is shaped like a flatbed, according to a first embodiment of the present disclosure.

The image forming apparatus 1 according to the present embodiment includes, for example, an image forming device 100 that forms an image on a sheet of paper P that serves as a printing object and an image reading unit 200 that reads an image formed on a document G that serves as an object to be scanned. In the image forming apparatus 1 according to the present embodiment, the image reading unit 200 and the image forming device 100 are formed as a single integrated unit, and the image reading unit 200 is arranged above the image forming device 100. However, no limitation is indicated thereby, and the image reading unit 200 and the image forming device 100 may be arranged in a separate manner. In such a configuration, the image reading unit 200 and the image forming device 100 are connected to each other and can communicate with each other.

Firstly, the image forming device 100 is described below.

The image forming device 100 is a tandem image forming apparatus in which a plurality of image forming units 10Y, 10M, 10C, and 10K that correspond to yellow (Y), magenta (M), cyan (C), and black (K) colors, respectively, are arranged along the rotation direction of an intermediate transfer belt 20 that serves as an intermediate transferor. The image forming units 10Y, 10M, 10C, and 10K are provided with a plurality of photoconductors 11Y, 11M, 11C, and 11K that serve as latent-image bearers, respectively. Each one of the multiple image forming units 10Y, 10M, 10C, and 10K is provided with a charging device, an optical writing device, a developing device, a primary transfer device, and a cleaner around the multiple photoconductors 11Y, 11M, 11C, and 11K. The charging device serves as a charger and evenly charges the surface of corresponding one of the photoconductors 11Y, 11M, 11C, and 11K at a predetermined level of electrical potential, and the optical writing device serves as an electrostatic latent image forming unit and expose the surface of corresponding one of the photoconductors 11Y, 11M, 11C, and 11K and write an electrostatic latent image on the surface of the corresponding one of the photoconductors 11Y, 11M, 11C, and 11K whose surfaces have been evenly charged by the charging devices according to the image data. The developing device forms a toner image through the developing procedure in which toner of corresponding one of the yellow (Y), magenta (M), cyan (C), and black (K) colors is made adhered to the electrostatic latent image formed on the corresponding one of the photoconductors, and the primary transfer device serves as a primary transfer unit and transfers the toner image formed on each one of the photoconductors onto the intermediate transfer belt 20. The cleaner removes and cleans the transfer residual toner formed on each one of the photoconductors.

The multicolor toner images that are formed on of the respective photoconductors 11Y, 11M, 11C, and 11K are primarily transferred onto the intermediate transfer belt 20 by the primary transfer device so as to be superimposed on top of one another.

As a result, a color toner image is formed on the intermediate transfer belt 20. As the intermediate transfer belt 20 rotates, the color toner image that is formed on the intermediate transfer belt 20 is conveyed to the facing space where the intermediate transfer belt 20 and the secondary transfer device 30 face each other. The above facing space may be referred to as a secondary transfer area in the following description.

Moreover, in the configuration according to the first embodiment of the present disclosure, a sheet tray 60 that stores the sheet of paper P is provided under the image forming device 100. The sheet tray 60 according to the first embodiment of the present disclosure includes a pair of sheet feeding trays including an upper sheet feeding tray 60A and a lower sheet feeding tray 60B. The sheet tray 60 according to the present embodiment causes a pickup roller 61 to feed the sheet of paper P on a one-by-one basis from one of the upper sheet feeding tray 60A and the lower sheet feeding tray 60B, which is selected based on the instructions sent from the controller 500 of the image forming device 100. Accordingly, the sheet of paper P is conveyed to the secondary transfer area through a conveyance roller pair 62 along the conveyance path indicated by the broken lines in FIG. 1.

The color toner image that is formed on the intermediate transfer belt 20 is transferred onto the sheet P, which is conveyed through the conveyance roller pair 62 at a prescribed timing, at the secondary transfer area by a secondary transfer device 30 in the secondary transfer process. The sheet of paper P on which a color toner image has been formed is then conveyed to a fixing device 40 that serves as a fixing unit, and heat and pressure are applied to the sheet of paper P to fix the color toner image on the sheet of paper P. The sheet of paper P on which the color toner has been fixed is conveyed along the conveyance path indicated by the broken lines in FIG. 1, and is sent to a sheet ejection unit 50 that serves as an ejection unit.

The sheet ejection unit 50 according to the first embodiment of the present disclosure is disposed in an upper portion of the image forming device 100, and a pair of lower output tray 50A and upper output tray 50B that receive the sheet of paper P on which an image has been formed are arranged in two layers including an upper layer and a lower layer. The sheet of paper P on which the color toner has been fixed is ejected to one of the lower output tray 50A and the upper output tray 50B, which is selected based on the instructions sent from the controller 500 of the image forming device 100, through the output roller pair 51, and is placed on the lower output tray 50A and the upper output tray 50B. The image reading unit 200 according to the present embodiment is described below.

The image reading unit 200 according to the first embodiment of the present disclosure is provided with a carriage 220 that serves as a moving scanner and scan the image on the document G while moving under the contact glass 210 along the surface of the contact glass 210 on which a document is placed in a horizontal direction.

The image reading unit 200 according to the first embodiment of the present disclosure includes, for example, a light source that irradiates the document G on the contact glass 210 with light, a plurality of reflection mirrors that guide the light reflected from the document G to a prescribed direction, a condenser lens through which the light reflected from the document G converges, and a charge coupled device (CCD) sensor that converts the converged reflection light into an electrical signal and outputs the obtained electrical signal. Among these elements of the image reading unit 200 according to the first embodiment of the present disclosure, the carriage 220 is equipped with the light source and some of the multiple reflection mirrors.

The carriage 220 according to the first embodiment is equipped with a RFID reader and writer 400 provided with an antenna unit that performs short-range radio communication with the RFID tag 300G of the document G. The RFID tag 300G of the document G serves as an information storage unit. Due to such a configuration, the RFID reader and writer 400 according to the present embodiment can perform short-range radio communication with the RFID tag 300G on the document G to read the data stored in the RFID tag 300G while the carriage 220 is scanning the image on the document G. For example, ID data such as unique numbers is recorded onto the RFID tag 300G in advance so as to be distinguished from other RFID tags. In such a configuration, the RFID reader and writer 400 reads such ID data, and sends the read ID data to the controller 500 of the image forming apparatus 1.

Moreover, the RFID reader and writer 400 according to the present embodiment can perform short-range radio communication with the RFID tag 300G on the document G to write data to the RFID tag 300G while the carriage 220 is scanning the image on the document G. For example, the identification data of the image forming apparatus 1 according to the present embodiment that has scanned the image on the document G using the image reading unit 200, the date and time information of scanning, and the user data of the scanned image are written to the RFID tag 300G on the document G. As a result, the scanning history of the image on the document G is recorded on the RFID tag 300G on the document G.

If another RFID tag exists near the RFID reader and writer 400 in the above configuration when the RFID reader and writer 400 reads data from the RFID tag 300G on the document G or when the RFID reader and writer 400 writes data to the RFID tag 300G on the document G, the data reading and data writing under normal operating conditions may be disturbed due to, for example, jamming or interference. In particular, in the first embodiment of the present disclosure, the lower output tray 50A and the upper output tray 50B of the image forming device 100 are close to the carriage 220 on which the RFID reader and writer 400 is mounted and are arranged below the carriage 220 on which the RFID reader and writer 400 is mounted. For this reason, for example, when a sheet of paper on which an RFID tag is mounted are placed on the lower output tray 50A and the upper output tray 50B, there is some concern that the data reading operation from the RFID tag 300G on the document G or the data writing operation to the RFID tag 300G on the document G may be interrupted due to the short-range radio communication with the RFID tag on the sheet of paper P.

In order to handle such a situation, in the first embodiment of the present disclosure, the carriage 220 on which the RFID reader and writer 400 is mounted is stored in the shielding case 230 that blocks the radio wave of the short-range radio communication performed by the RFID reader and writer 400, and the carriage 220 moves back and forth inside the shielding case 230. In the present embodiment, it is necessary for the RFID reader and writer 400 mounted on the carriage 220 to perform short-range radio communication with the RFID tag 300G on the document G that is placed above the RFID reader and writer 400. Due to such a configuration, the shielding case 230 has an opening on its upper side above the position at which the RFID reader and writer 400 mounted on the carriage 220 performs the short-range radio communication. In the first embodiment of the present disclosure, the RFID reader and writer 400 that is mounted on the carriage 220 performs short-range radio communication with the RFID tag 300G on the document G while the carriage 220 is moving to scan the image on the document G.

For this reason, the shielding case 230 is open approximately all over its top surface.

In view of not only the shielding properties and characteristics indicating how well the radio wave of the short-range radio communication can be shielded but also, for example, the rigidity or safety of the carriage 220 as a casing, it is desired that the materials of the shielding case 230 be metal such as a steel sheet and an aluminum plate. The opening on the top surface of the shielding case 230 may be closed by a member that does not block the radio wave of the short-range radio communication. Preferably, a fire-resistant material is used as such a member that fills and closes the opening on the top surface of the shielding case 230.

Figure 2:
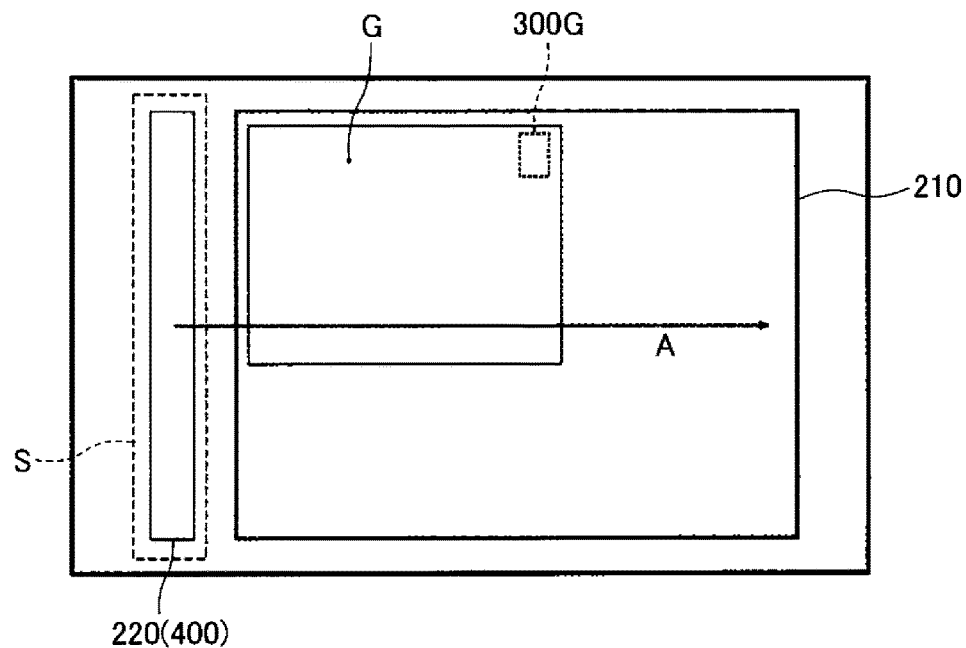
FIG. 2 is a top view of an image reading unit in which a document is placed on a contact glass, according to the first embodiment of the present disclosure.

FIG. 2 is a top view of the image reading unit 200 in which the document G is placed on the contact glass 210, according to the present embodiment.

The effective range in which the communication is enabled and the RFID reader and writer 400 that is attached to the carriage 220 can perform the data reading operation from the RFID tag 300G on the document G and the data writing operation to the RFID tag 300G on the document G is approximately equivalent to the range that is covered by broken lines and is indicated by a reference sign S in FIG. 2. The range in which the communication is enabled according to the first embodiment of the present disclosure is approximately equivalent to the readable range of the image that can be scanned by the image reading unit 200 in the up-and-down directions in FIG. 2 that are perpendicular to the right and left directions in FIG. 2 in which the carriage 220 moves. However, no limitation is indicated thereby, and the range in which the communication is enabled according to the first embodiment of the present disclosure may be narrower than or wider than the readable range of the image. Typically, the readable range of the image is configured to be equal to or slightly wider than the width of the document G of the maximum readable size.

When the image on the document G is to be scanned and obtained by the image reading unit 200, the carriage 220 is moved from the standby position indicated by a solid line in FIG. 2, which corresponds to the position at which the carriage 220 is indicated by a virtual line in FIG. 1, in the horizontal directions indicated by an arrow A in FIG. 2. Due to such a configuration, the image on the document G can be read as desired all across the document G that is placed on the contact glass 210. Moreover, as the RFID reader and writer 400 moves back and forth as the carriage 220 moves during the image reading operation, data can be read from the RFID tag 300G on the document G and data can be written to the RFID tag 300G on the document G all across the document G that is placed on the contact glass 210. Due to such a configuration, regardless of the position of the RFID tag 300G provided for or pasted on the document G, data can be read from the RFID tag 300G on the document G and data can be written to the RFID tag 300G on the document G.

Figure 3:
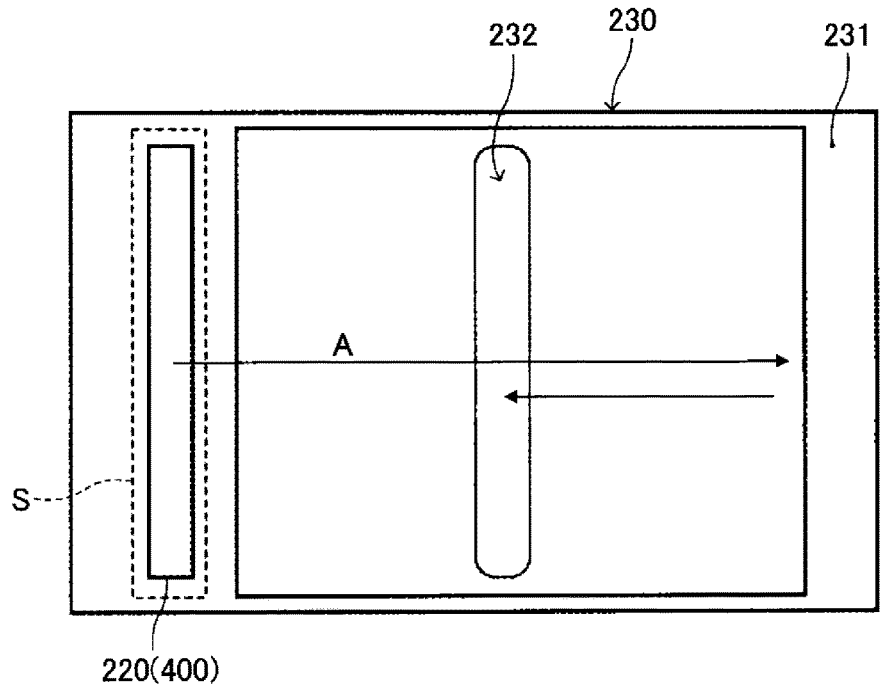
FIG. 3 is a plan view of the inside of a shielding case that accommodates a carriage when viewed from above, according to the first embodiment of the present disclosure.

FIG. 3 is a plan view of the inside of the shielding case 230 that accommodates the carriage 220 when viewed from above, according to the present embodiment.

The RFID reader and writer 400 that is mounted on the carriage 220 according to the first embodiment of the present disclosure may also serve as an antenna unit that performs the short-range radio communication with the RFID tag 300P that serves as an information storage unit of the sheet of paper P on which an image is formed by the image forming device 100. Due to such a configuration, the RFID reader and writer 400 according to the present embodiment, and can perform short-range radio communication with the RFID tag 300P on the sheet of paper P on which an image is formed to read the data stored in the RFID tag 300P. For example, ID data such as unique numbers is recorded onto the RFID tag 300P in advance so as to be distinguished from other RFID tags. In such a configuration, the RFID reader and writer 400 reads such ID data, and sends the read ID data to the controller 500 of the image forming apparatus 1.

Moreover, the RFID reader and writer 400 according to the present embodiment can perform short-range radio communication with the RFID tag 300P on the sheet of paper P on which an image is formed to write data to the RFID tag 300P. For example, the identification data of the image forming apparatus 1 according to the present embodiment that has formed an image on the sheet of paper P, the date and time information of image formation, and the user data of the formed image are written to the RFID tag 300P on the sheet of paper P. As a result, the formation history of the image on the sheet of paper P is recorded on the RFID tag 300P on the sheet of paper P.

In the first embodiment of the present disclosure, the RFID reader and writer 400 is provided for the carriage 220 of the image reading unit 200. Due to such a configuration, preferably, the data reading operation from the RFID tag 300P on the sheet of paper P and the data writing operation to the RFID tag 300P on the sheet of paper P are performed above the image forming device 100 close to the image reading unit 200. Due to such a configuration, the distance can be shortened that the carriage 220 is moved to the position at which the short-range radio communication is performed with the RFID tag 300P on the sheet of paper P. Moreover, for example, the length of time of the movement can be shortened, and the space for the path of the movement can be reduced.

In view of such circumstances, in the first embodiment of the present disclosure, when the sheet of paper P is ejected to the sheet ejection unit 50 that is disposed in an upper portion of the image forming device 100, the controller 500 performs the data reading operation from the RFID tag 300P on the sheet of paper P and the data writing operation to the RFID tag 300P on the sheet of paper P. More specifically, data is read from the RFID tag 300P on the sheet of paper P that is ejected to the upper output tray 50B that is close to the RFID reader and writer 400, and data is written to the RFID tag 300P on the sheet of paper P that is ejected to the upper output tray 50B that is close to the RFID reader and writer 400, from among the pair of lower output tray 50A and the upper output tray 50B of the sheet ejection unit 50. Due to such a configuration, even if the connectable range of the RFID reader and writer 400 is short, the data reading operation from the RFID tag 300P on the ejected sheet of paper P and the data writing operation to the RFID tag 300P on the ejected sheet of paper P can appropriately be performed.

The timing at which data is read from the RFID tag 300P on the sheet of paper P or data is written to the RFID tag 300P on the sheet of paper P is not limited to when the sheet of paper P is ejected to the sheet ejection unit 50. For example, data may be read from the RFID tag 300P on the sheet of paper P or data may be written to the RFID tag 300P on the sheet of paper P while the sheet of paper is being conveyed after the fixation is done inside the image forming device 100, or data may be read from the RFID tag 300P on the sheet of paper P or data may be written to the RFID tag 300P on the sheet of paper P while the sheet of paper is being conveyed after the secondarily-transferring process is done but before the fixation is done. Alternatively, data may be read from the RFID tag 300P on the sheet of paper P or data may be written to the RFID tag 300P on the sheet of paper P while the sheet of paper is being conveyed from the sheet tray 60 before the secondarily-transferring process starts. However, when the data reading operation from the RFID tag 300P on the sheet of paper P or the data writing operation to the RFID tag 300P on the sheet of paper P is performed while the sheet of paper P is being ejected to the sheet ejection unit 50 as in the first embodiment of the present disclosure, the data can be read from the RFID tag 300P on the sheet of paper P on which an image has been formed and the data writing operation to the RFID tag 300P on the sheet of paper P on which an image has been formed.

As described above, in the first embodiment of the present disclosure, the carriage 220 on which the RFID reader and writer 400 is mounted is accommodated inside the shielding case 230. Due to such a configuration, when the data is to be read from the RFID tag 300G on the document G or when the data is to be written to the RFID tag 300G on the document G, the radio wave of the short-range radio communication does not reach the RFID tag 300P of the sheet of paper P on the image forming device 100 side, in particular, the sheet of paper P ejected to the sheet ejection unit 50. However, in the first embodiment of the present disclosure, there are some cases in which the RFID reader and writer 400 needs to be used for the data reading operation from the RFID tag 300P on the sheet of paper P that is ejected to an upper output tray 50B of the sheet ejection unit 50 and the data writing operation to the RFID tag 300P on the sheet of paper P that is ejected to the upper output tray 50B of the sheet ejection unit 50.

For this reason, as illustrated in FIG. 3, an opening 232 is formed on the bottom of the shielding case 230 at the position where the RFID reader and writer 400 mounted on the carriage 220 performs the short-range radio communication with the RFID tag 300P on the sheet of paper P that is ejected to the upper output tray 50B of the sheet ejection unit 50. The opening 232 of the shielding case 230 may be filled and closed by a member that does not block the radio wave of the short-range radio communication. Preferably, a fire-resistant material is used as such a member that fills and closes the opening 232 on the top surface of the shielding case 230.

As described above, in the first embodiment of the present disclosure, each one of the data reading operation from the RFID tag 300G on the document G and the data writing operation to the RFID tag 300G on the document G, the data reading operation from the RFID tag 300P on the sheet of paper P on which an image to be formed, and the data writing operation to the RFID tag 300P on the sheet of paper P on which an image is to be formed is performed and implemented by the short-range radio communication with the same RFID reader and writer 400. Due to such a configuration, for example, the number of components can be reduced, and the footprint can be reduced compared with a configuration or structure in which a plurality of RFID readers and writers are provided on an individual basis for each process. In particular, in a configuration or structure in which a plurality of RFID readers and writers are provided on an individual basis for each process, measures such as radio shielding need to be taken for each one of the RFID readers and writers to avoid jamming, interference, or the like that could happen between the short-range radio communication performed by one of the RFID readers and writers and the short-range radio communication performed by another one of the RFID readers and writers, and a member such as the shielding case 230 needs to be provided to implement such measures. In the first embodiment of the present disclosure, such a member is unnecessary, and thus for example, the number of components can be reduced, and the footprint can be reduced.

Moreover, in the above-described configuration or structure in which a plurality of RFID readers and writers are provided on an individual basis for each process, if measures such as radio shielding are not sufficiently taken, there is some concern that, for example, the multiple RFID readers and writers that are supposed to perform the data reading operation from the RFID tag 300G on the document G and the data writing operation to the RFID tag 300G on the document G may erroneously perform the data reading operation from the RFID tag 300P on the sheet of paper P and the data writing operation to the RFID tag 300P on the sheet of paper P. According to the first embodiment of the present disclosure, the same RFID reader and writer 400 is used for each of the different processes, and if, for example, the operations are performed at differential times, erroneous data reading or writing can easily be prevented.

In the configuration or structure where the RFID reader and writer 400 is mounted on the carriage 220 of the image reading unit 200 as in the first embodiment of the present disclosure, the RFID reader and writer 400 that is mounted on the carriage 220 is accessible just by removing the contact glass 210, and the maintenance is easier than the configuration or structure in which the RFID reader and writer 400 is arranged deep inside the image forming device 100. Moreover, the retrofitting of an RFID reader and writer to the products that are commercially available and are not provided with such an RFID reader and writer 400 as above is relatively easy.

Second Embodiment

Figure 4:
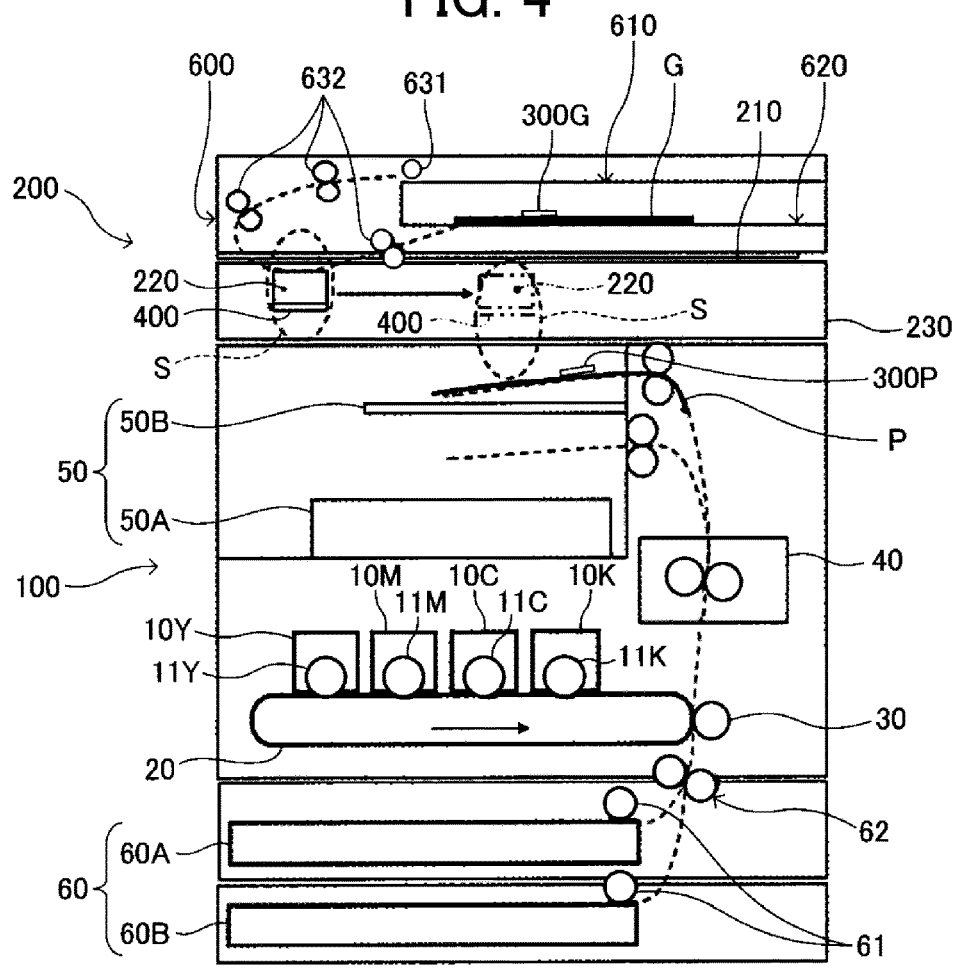
FIG. 4 is a schematic diagram illustrating an image forming apparatus provided with an image reading unit of sheet through type, according to a second embodiment of the present disclosure.

FIG. 4 is a schematic diagram illustrating the image forming apparatus in which the image reading unit is of sheet through type, according to a second embodiment of the present disclosure.

The configuration or structure of the image forming device 100 in the image forming apparatus 1 according to the second embodiment of the present disclosure is equivalent to the configuration or structure of the first embodiment of the present disclosure as described above. Accordingly, the description of the configuration or structure of the image forming device 100 according to the second embodiment of the present disclosure is omitted, and overlapping descriptions with the description of the first embodiment as described above is omitted where appropriate.

The image reading unit 200 according to the second embodiment of the present disclosure is provided with an automatic document feeder (ADF) 600. The ADF 600 conveys the document G that is set on a document table 610 on a one-piece-by-one-piece basis using a pickup roller 631. The document G that is conveyed by the pickup roller 631 is conveyed along the conveyance path indicated by the broken lines in FIG. 4 by a plurality of conveyance roller pairs 632, and is ejected onto a document ejection stage 620.

In a similar manner to the configuration or structure of the first embodiment of the present disclosure as described above, the image reading unit 200 according to the second embodiment of the present disclosure is provided with the carriage 220, and can read the image on the document G placed on the contact glass 210. When the image on the conveyed document G conveyed by the ADF 600 is to be read in the second embodiment of the present disclosure, the carriage 220 stops at a standby position indicated by a solid line in FIG. 4. The carriage 220 is kept stationary, and the image on the document G is scanned and obtained while the document G conveyed by the ADF 600 is passing through the image reading area above the carriage 220.

The carriage 220 according to the second embodiment of the present disclosure is also provided with a RFID reader and writer 400 that performs short-range radio communication with the RFID tag 300G of the document G. Due to such a configuration, while the document G is passing through the image reading area above the carriage 220 that is kept stationary at the standby position, the RFID reader and writer 400 according to the present embodiment can perform short-range radio communication with the RFID tag 300G on the document G to read the data stored in the RFID tag 300G, and can perform short-range radio communication with the RFID tag 300G on the document G to write data to the RFID tag 300G.

The RFID reader and writer 400 that is mounted on the carriage 220 according to the second embodiment of the present disclosure can perform short-range radio communication with the RFID tag 300P of the sheet of paper P on which an image is formed by the image forming device 100 to read the data stored in the RFID tag 300P. Moreover, the RFID reader and writer 400 according to the present embodiment can perform short-range radio communication with the RFID tag 300P on the sheet of paper P on which an image is formed to write data to the RFID tag 300P.

In a similar manner to the configuration or structure of the first embodiment of the present disclosure as described above, the data reading operation from the RFID tag 300P on the sheet of paper P that is ejected to an upper output tray 50B of the sheet ejection unit 50 and the data writing operation to the RFID tag 300P on the sheet of paper P that is ejected to the upper output tray 50B of the sheet ejection unit 50 are also performed in the second embodiment of the present disclosure. In other words, when the data reading operation from the RFID tag 300P on the sheet of paper P and the data writing operation to the RFID tag 300P on the sheet of paper P are performed, the carriage 220 is moved to the position at which the carriage 220 is indicated by a virtual line in FIG. 4, and the short-range radio communication is performed with the RFID tag 300P on the sheet of paper P through the opening 232 that is arranged on the bottom of the shielding case 230. Such a position at which the carriage 220 is indicated by a virtual line may be referred to as the second communicating position.

As described above, in the second embodiment of the present disclosure, each one of the data reading operation from the RFID tag 300G on the document G and the data writing operation to the RFID tag 300G on the document G, the data reading operation from the RFID tag 300P on the sheet of paper P on which an image to be formed, and the data writing operation to the RFID tag 300P on the sheet of paper P on which an image is to be formed is performed and implemented by the short-range radio communication with the same RFID reader and writer 400. Accordingly, effects similar to those achieved by the first embodiment of the present disclosure as described above can be achieved in the second embodiment of the present disclosure.

As illustrated in FIG. 4, in the second embodiment of the present disclosure, the conveyance path of the document G in the ADF 600 turns, and the document G traverses above the RFID reader and writer 400 that is at the standby position twice in the conveyance path. Due to such a configuration, if the output power of the RFID reader and writer 400 is too high, the communication range of the short-range radio communication of the RFID reader and writer 400 is so wide that the communication range may cover the RFID tags 300G of a plurality of documents G.

By contrast, if the output power of the RFID reader and writer 400 is reduced such that the communication range will cover only closer one of the two points of the conveyance path at which the document G traverses above the RFID reader and writer 400 that is at the standby position, the communication range of the RFID reader and writer 400 becomes too narrow to cover the RFID tag 300P of the sheet of paper P that is ejected to the upper output tray 50B of the sheet ejection unit 50, and the data reading operation from the RFID tag 300P on the sheet of paper P and the data writing operation to the RFID tag 300P on the sheet of paper P cannot appropriately be performed.

In order to handle such a situation, in the second embodiment of the present disclosure, the output power of the RFID reader and writer 400 may be changed differently between the data reading operation from the RFID tag 300G on the document G and the data writing operation to the RFID tag 300G on the document G, and the data reading operation from the RFID tag 300P on the sheet of paper P on which an image to be formed and the data writing operation to the RFID tag 300P on the sheet of paper P on which an image is to be formed. More specifically, the output power of the RFID reader and writer 400 is reduced when data is read from the RFID tag 300G on the document G or when data is written to the RFID tag 300G on the document G, and the output power of the RFID reader and writer 400 is increased when data is read from the RFID tag 300P on the sheet of paper P on which an image to be formed or when data is written to the RFID tag 300P on the sheet of paper P on which an image is to be formed. By so doing, both operations can be carried out appropriately.

Figure 5:
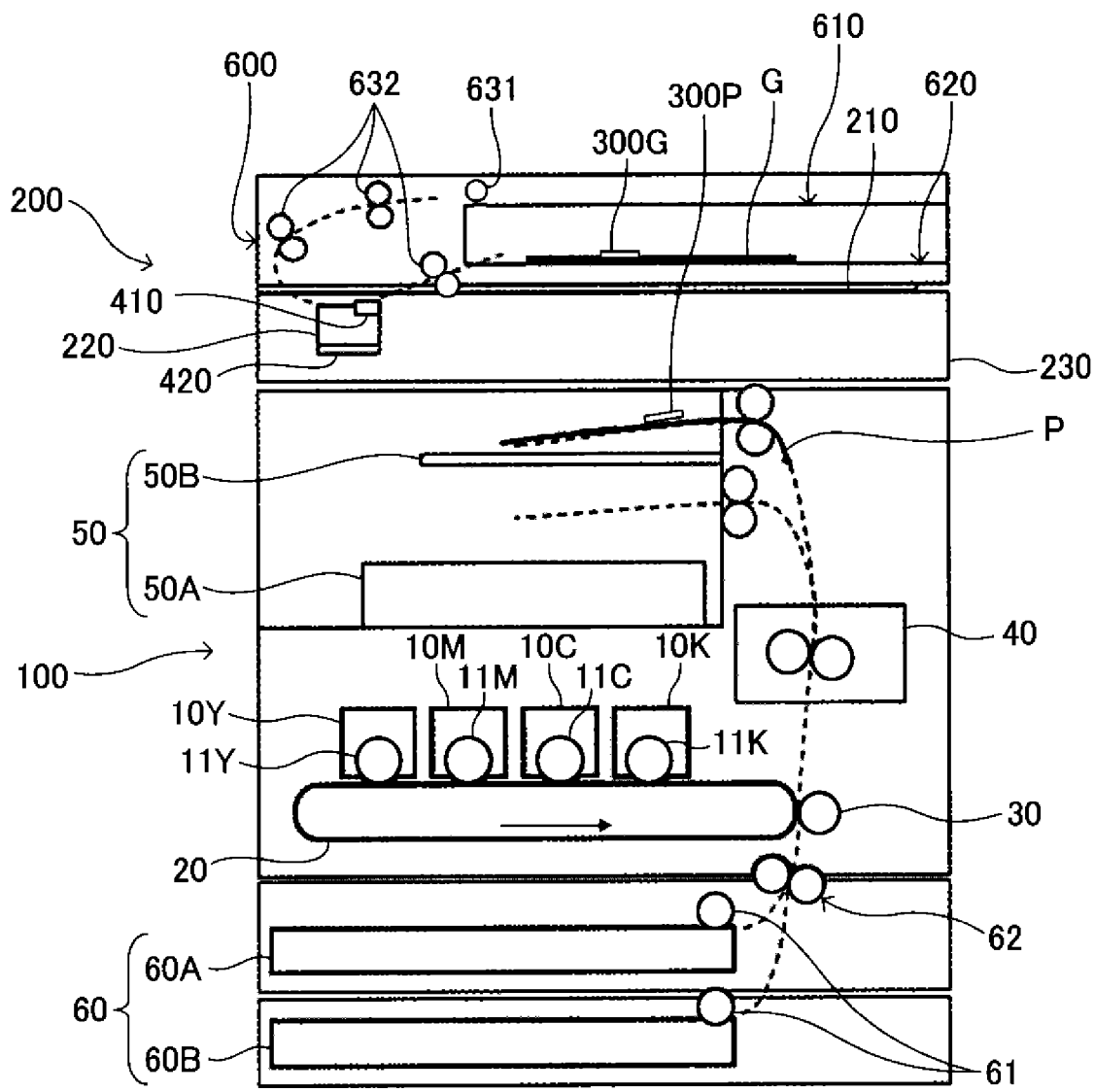
FIG. 5 is a schematic diagram illustrating an image forming apparatus in which a pair of radiofrequency identification (RFID) readers and writers whose communication modes for short-range radio communication are different from each other are mounted on a carriage, according an embodiment of the present disclosure.

FIG. 5 is a schematic diagram illustrating the image forming apparatus 1 in which a pair of RFID readers and writers whose communication modes for short-range radio communication are different from each other are mounted on the carriage 220, according to the above embodiments of the present disclosure. Instead of changing the output power of the RFID reader and writer 400 between these operations, the communication modes for short-range radio communication may be differentiated from each other. For example, as illustrated in FIG. 5, an RFID reader and writer 410 that is used when data is read from the RFID tag 300G on the document G or when data is written to the RFID tag 300G on the document G, and another RFID reader and writer 420 that is used when data is read from the RFID tag 300P on the sheet of paper P on which an image to be formed or when data is written to the RFID tag 300P on the sheet of paper P on which an image is to be formed may be disposed on the carriage 220. Moreover, the RFID reader and writer 410 performs the short-range radio communication with a communication mode with a short communication range, for example, a communication mode that uses a high-frequency (HF) radio or radar signal whose band of frequencies is high, and the RFID reader and writer 420 performs the short-range radio communication with a communication mode with a wide communication range, for example, a communication mode that uses a ultrahigh frequency (UHF) radio or radar signal whose band of frequencies is ultrahigh.

By so doing, both operations can be carried out appropriately.

In such a configuration, it is desired that the RFID reader and writer 410 be arranged on an upper side of the carriage 220. This is because the communication range of the RFID reader and writer 410 is relatively narrow and the distance between the RFID reader and writer 410 and the document G is to be minimized. On the other hand, it is desired that the RFID reader and writer 420 be arranged below the carriage 220 so as to minimize the distance with the sheet of paper P and in order to avoid the jamming or interference with the first RFID reader and writer 410.

Modification

Some modifications of the carriage 220 according to the first or second embodiment of the present disclosure as described above are described below.

The short-range radio communication that is performed between the RFID reader and writer 410 and the RFID tag 300G or the RFID tag 300P of the document G or the sheet of paper P may fail under abnormal operating conditions. For example, such failures occur when the communication range is shortened due to the reflection of a radio or radar signal or when radio or radar signals interfere with each other. Such failures can be improved or overcome by arranging a radio or radar signal reflector or a radio or radar signal absorber near the antenna of the RFID reader and writer 410. In particular, when a radio or radar signal is used whose band of frequencies is high such as a radio or radar signal that uses an ultrahigh frequency (UHF) radio or radar signal whose band of frequencies is ultrahigh, the directionality of such a radio or radar signal is so high that a radio or radar signal tends to be reflected by a substance with high density such as metal. In such cases, the above short-range radio communication is easily affected by the reflection of a radio or radar signal.

Figure 6A:
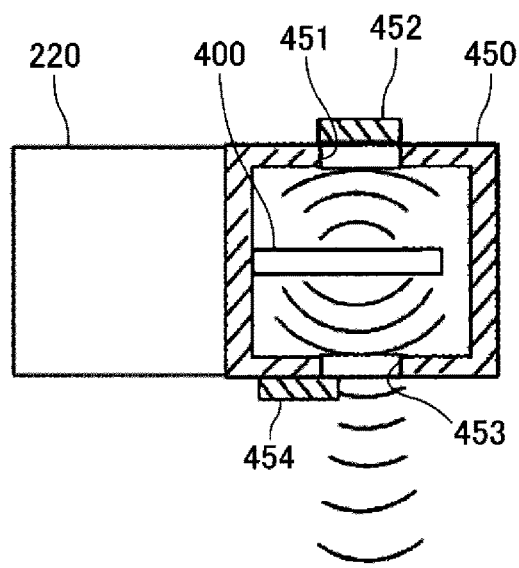
FIG. 6A and FIG. 6B are schematic diagrams each illustrating a configuration or structure of a carriage according to a modification of an embodiment of the present disclosure.
Figure 6B:
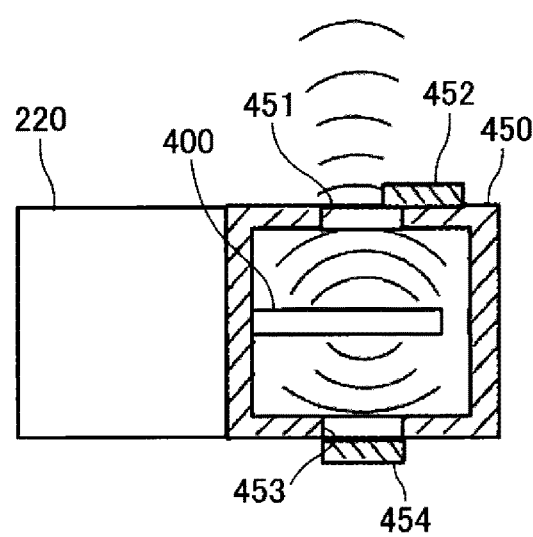

FIG. 6A and FIG. 6B are schematic diagrams each illustrating a configuration or structure of the carriage 220 according to the present modification of the above embodiments of the present disclosure.

Figure 7:
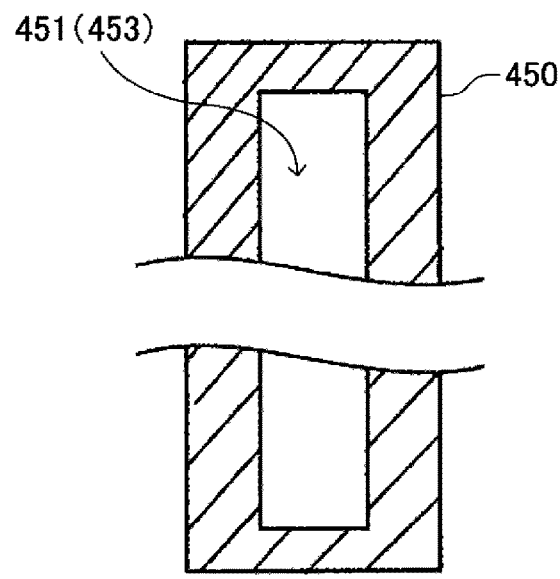
FIG. 7 is a schematic plan view of a casing of an RFID reader and writer mounted on a carriage, according to a modification of an embodiment of the present disclosure.

FIG. 7 is a schematic plan view of a casing 450 of the RFID reader and writer 410 mounted on the carriage 220, according to the present modification of the above embodiments of the present disclosure.

The RFID reader and writer 410 according to the present modification of the above embodiments of the present disclosure is stored in a casing 450 such as a metallic casing that is formed by a substance with high density such as metal, and is mounted on the carriage 220. Moreover, the casing 450 has an opening 451 on its top face so that the RFID reader and writer 410 that is disposed inside the casing 450 can perform the short-range radio communication with the RFID tag 300G on the document G. In a similar manner, the casing 450 has an opening 453 on its bottom face such that the RFID reader and writer 410 can perform the short-range radio communication with the RFID tag 300P on the sheet of paper P.

As the RFID reader and writer 410 is stored inside the above-described casing 450, the directionality of the radio or radar signal of the second RFID reader and writer 410 can be controlled or restricted to a target such as the RFID tag 300G or the RFID tag 300P, and the degree of reliability or the stability of the data communication can further be improved.

In particular, as illustrated in FIG. 6A and FIG. 6B, preferably, an openable and closable lid 452 that absorbs or reflects the radio wave of the short-range radio communication is provided for the opening 451 that is formed on the top face of the casing 450. In such a configuration, for example, the opening 451 on the top face is closed by the openable and closable lid 452 when the RFID reader and writer 410 performs the short-range radio communication with the RFID tag 300P on the sheet of paper P through the opening 453 that is formed on the bottom face of the casing 450. By so doing, the degree of reliability or the stability of the short-range radio communication with the RFID tag 300P on the sheet of paper P can further be improved.

In a similar manner, as illustrated in FIG. 6A and FIG. 6B, preferably, an openable and closable lid 454 that absorbs or reflects the radio wave of the short-range radio communication is provided for the opening 453 that is formed on the bottom face of the casing 450. In such a configuration, for example, the opening 453 on the bottom face is closed by the openable and closable lid 454 when the RFID reader and writer 410 performs the short-range radio communication with the RFID tag 300G on the document G through the opening 451 that is formed on the top face of the casing 450. By so doing, the degree of reliability or the stability of the short-range radio communication with the RFID tag 300G on the document G can further be improved.

The operation of the image forming apparatus 1 according to the present embodiment is described below.

Figure 8:
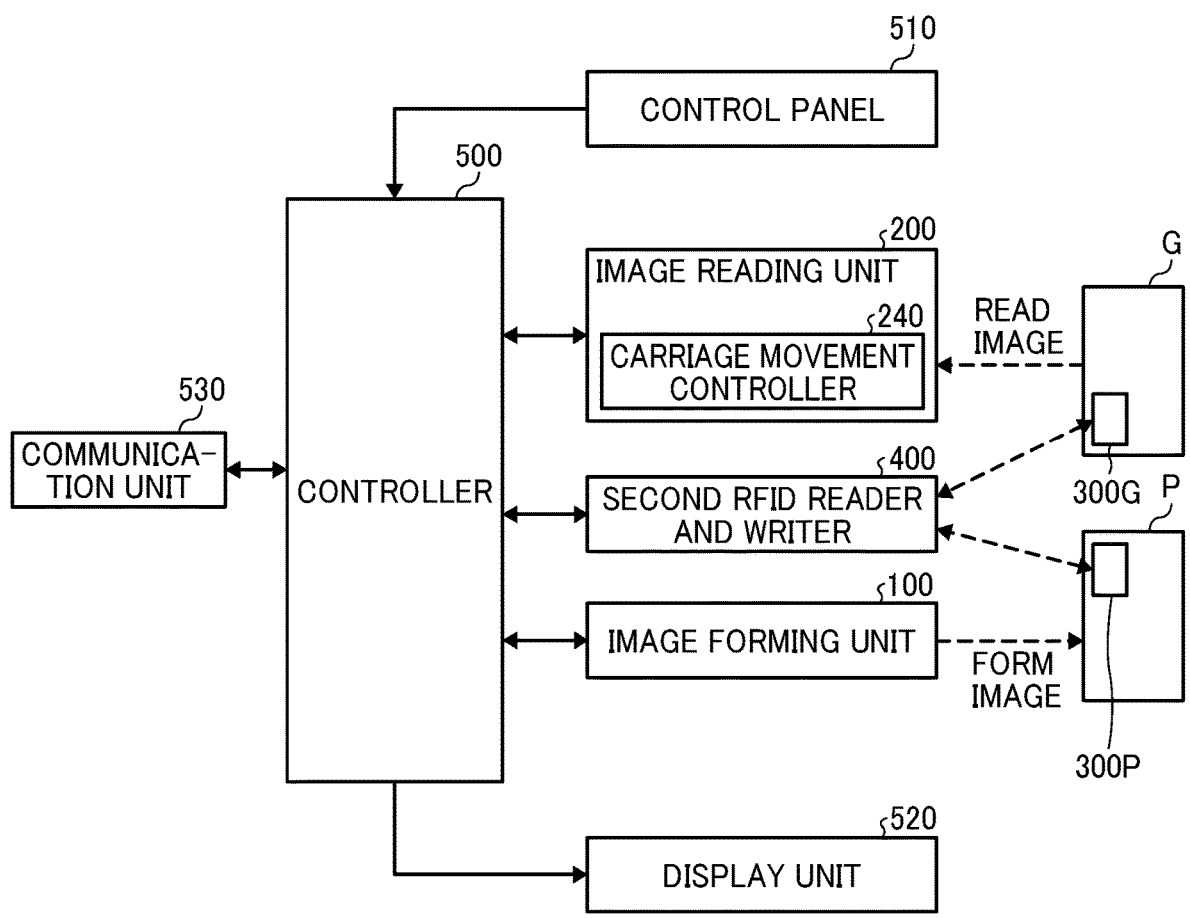
FIG. 8 is a block diagram of a main control system of an image forming apparatus including a controller, according to an embodiment of the present disclosure.

FIG. 8 is a block diagram of a main control system of the image forming apparatus 1 including the controller 500, according to the present embodiment.

The controller 500 according to the above embodiments of the present disclosure controls entire operation of the image forming apparatus 1. In order to achieve such functions, the elements of a computer such as a central processing unit (CPU), a random access memory (RAM), and a read only memory (ROM) execute a computer program such as various kinds of control programs. As a result, various kinds of processes and various kinds of controls are executed.

The controller 500 according to the above embodiments of the present disclosure serves as a first processing unit when it reads data from the RFID tag 300G on the document G or writes data to the RFID tag 300G on the document G. Moreover, the controller 500 controls the elements of the image reading unit 200 to perform the image-forming operation on the document G in accordance with the selection made on the operation panel 510, and controls the RFID reader and writer 400 to perform the data reading operation from the RFID tag 300G on the document G and the data writing operation to the RFID tag 300G on the document G. The notification of an error or a result of controlling operation is displayed on the display unit 520.

The RFID tag 300P is provided for the sheet of paper P on which the image forming device 100 forms an image, and the controller 500 according to the above embodiments of the present disclosure serves as a second processing unit when the controller 500 performs the data reading operation from the RFID tag 300P and the data writing operation to the RFID tag 300P. Moreover, the controller 500 controls the elements of the image forming device 100 to perform the image-forming operation on the sheet of paper Pin accordance with the selection made on the operation panel 510, and controls the RFID reader and writer 400 to perform the data reading operation from the RFID tag 300P on the sheet of paper P and the data writing operation to the RFID tag 300P on the sheet of paper P. The notification of an error or a result of controlling operation is displayed on the display unit 520.

Moreover, when the data reading operation from the RFID tag 300G and the RFID tag 300P on the document G and the sheet of paper P or the data writing operation to the RFID tag 300G and the RFID tag 300P on the document G and the sheet of paper P is completed, the controller 500 according to the above embodiments of the present disclosure may control the communication unit 530 to send an electronic mail to a destination that is specified in advance to deliver, for example, the data read from the RFID tag 300G or the RFID tag 300P and the data written to the RFID tag 300G or the RFID tag 300P, the image data read from the document G, or the image data formed on the sheet of paper P. Alternatively, for example, when the data reading operation from the RFID tag 300G and the RFID tag 300P on the document G and the sheet of paper P or the data writing operation to the RFID tag 300G and the RFID tag 300P on the document G and the sheet of paper P is completed, the controller 500 according to the above embodiments of the present disclosure may control the communication unit 530 to send to a prescribed server the data read from the RFID tag 300G or the RFID tag 300P and the data written to the RFID tag 300G or the RFID tag 300P, the image data read from the document G, or the image data formed on the sheet of paper P. The operation of the image forming apparatus according to the present embodiment is described below.

Figure 9:
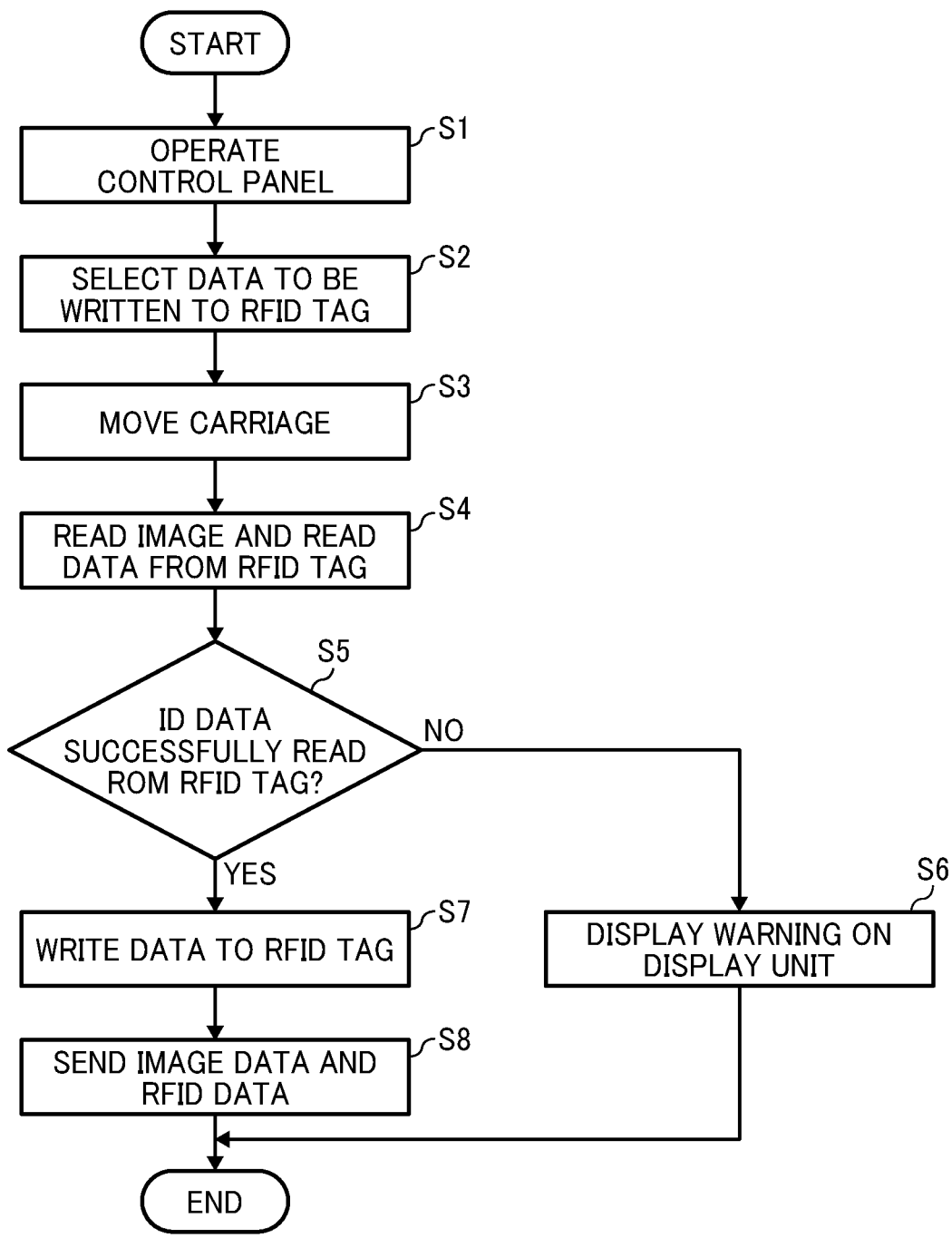
FIG. 9 is a flowchart of the operation performed by an image reading unit according to the first embodiment of the present disclosure.

FIG. 9 is a flowchart of the operation using the image reading unit 200 shaped like a flat plate, according to the above embodiments of the present disclosure.

When the image on the document G provided with the RFID tag 300G is to be scanned and obtained, firstly, in a step S1, a selection is made on the operation panel 510 of the image forming apparatus 1 to set the conditions for image reading or scanning. When some data is to be written to the RFID tag 300G on the document G, in a step S2, a selection is made as to what data is to be written. The data to be written may be, for example, the date and time information, the user data, and the data of security level.

Once a result of the above selection is input to the operation panel 510, in a step S3, the controller 500 moves the carriage 220, and performs image reading operation to read the image on the conveyed document G placed on the contact glass 210. Together with that, in a step S4, the controller 500 performs the data reading operation from the RFID tag 300G on the document G.

When the controller 500 has failed to read the data such as the ID data from the RFID tag 300G on the document G in the above step ("NO" in the step S5), in a step S6, the controller 500 causes the display unit 520 to display, for example, a warning message saying "FAILED TO ACQUIRE DATA FROM RFID", and terminates the image reading operation.

Figure 10:
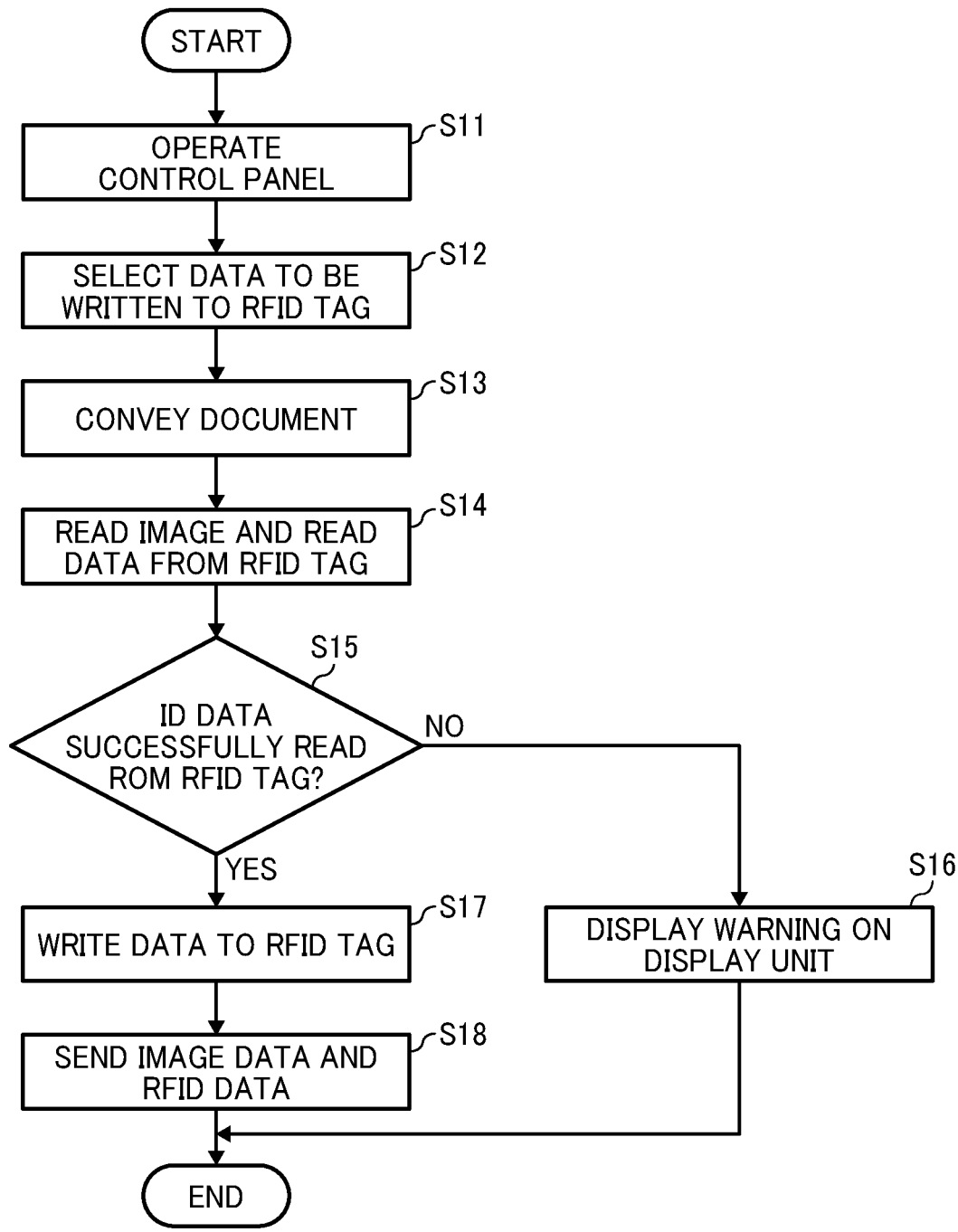
FIG. 10 is a flowchart of the operation performed by an image reading unit according to the second embodiment of the present disclosure.

On the other hand, when the controller 500 has successfully read the data such as the ID data from the RFID tag 300G on the document G ("YES" in the step S5), in a step S7, the controller 500 then writes the data selected in the above processing step S2 to the RFID tag 300G on the document G. Once the data reading operation from the RFID tag 300G on the document G and the data writing operation to the RFID tag 300G on the document G is completed, in a step S8, the controller 500 uses the communication unit 530 to transmit the data read from the RFID tag 300G, the data written to the RFID tag 300G, and the image data read from the document G FIG. 10 is a flowchart of the operation using the image reading unit 200 of sheet through type, according to the second embodiment of the present disclosure.

In steps S11 and S12, a selection is made on the operation panel 510 of the image forming apparatus 1 in a similar manner to the image reading unit 200 shaped like a flat plate. Then, in a step S13, the controller 500 causes the ADF 600 to convey the document G. In a step S14, the controller 500 performs the image reading operation to read the image on the conveyed document G, and performs the data reading operation from the RFID tag 300G on the document G.

When the controller 500 has failed to read the data such as the ID data from the RFID tag 300G on the document G in the above step ("NO" in the step S15), in a step S16, the controller 500 causes the display unit 520 to display, for example, a warning message saying "FAILED TO ACQUIRE DATA FROM RFID", and terminates the image reading operation.

Figure 11:
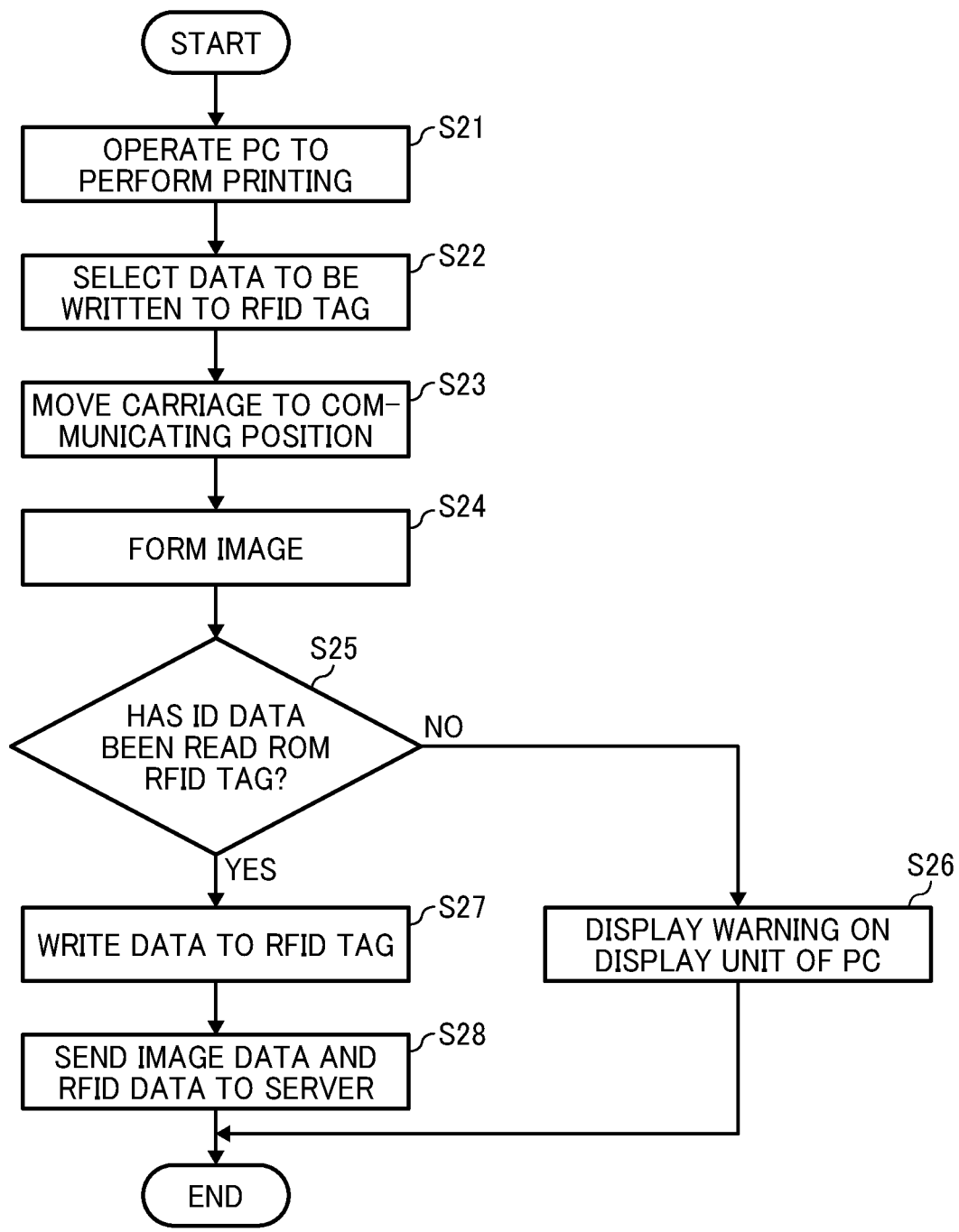
FIG. 11 is a flowchart of the operation of an image forming device according to an embodiment of the present disclosure.

On the other hand, when the controller 500 has successfully read the data such as the ID data from the RFID tag 300G on the document G ("YES" in the step S15), in a step S17, the controller 500 then writes the data selected in the above processing step S12 to the RFID tag 300G on the document G. Once the data reading operation from the RFID tag 300G on the document G and the data writing operation to the RFID tag 300G on the document G is completed, in a step S18, the controller 500 uses the communication unit 530 to transmit the data read from the RFID tag 300G, the data written to the RFID tag 300G, and the image data read from the document G FIG. 11 is a flowchart of the operation of the image forming device 100 according to the above embodiments of the present disclosure.

When an image is to be formed on the sheet of paper P provided with the RFID tag 300P, in a step S21, first of all, for example, a personal computer (PC) is manipulated to make a selection, and such a selection includes selecting the image data whose image is to be printed and adjusting the image-forming condition. Moreover, when some data is to be written to the RFID tag 300P on the sheet of paper P, in a step S22, for example, a personal computer (PC) is manipulated to make a selection as to what data is to be written. The data to be written may be, for example, the date and time information, the user data, and the data of security level.

Once a result of the above selection is input from the PC through the communication unit 530, in a step S23, the controller 500 controls the carriage movement controller 240 to move the carriage 220 to the communicating position at which the short-range radio communication is performed with the RFID tag 300P on the sheet of paper P, and such a communicating position includes the position at which the carriage 220 is indicated by a solid line in FIG. 1 and the position at which the carriage 220 is indicated by a virtual line in FIG. 4. Subsequently, in a step S24, the elements of the image forming device 100 are controlled to perform the image-forming operation on the sheet of paper P.

In a step S25, the controller 500 then performs the data reading operation from the RFID tag 300P on the sheet of paper P while the sheet of paper P on which an image has been formed is being ejected to the upper output tray 50B, using the second RFID reader and writer 400. When the controller 500 has failed to read the data such as the ID data from the RFID tag 300P on the sheet of paper P in the above step ("NO" in the step S25), in a step S26, the controller 500 controls the communication unit 530 to send, for example, a warning message saying "FAILED TO ACQUIRE DATA FROM RFID" to a PC so as to be displayed on the display unit of the PC, and terminates the image-forming operation.

On the other hand, when the controller 500 has successfully read the data such as the ID data from the RFID tag 300P on the sheet of paper P ("YES" in the step S25), in a step S27, the controller 500 then writes the data selected in the above processing step S22 to the RFID tag 300P on the sheet of paper P. Then, once the data reading operation from the RFID tag 300P on the sheet of paper P and the data writing operation to the RFID tag 300P on the sheet of paper P is completed, in a step S28, the controller 500 uses the communication unit 530 to transmit the data read from the RFID tag 300P, the data written to the RFID tag 300P, and the image data formed on the sheet of paper P.

Figure 12:
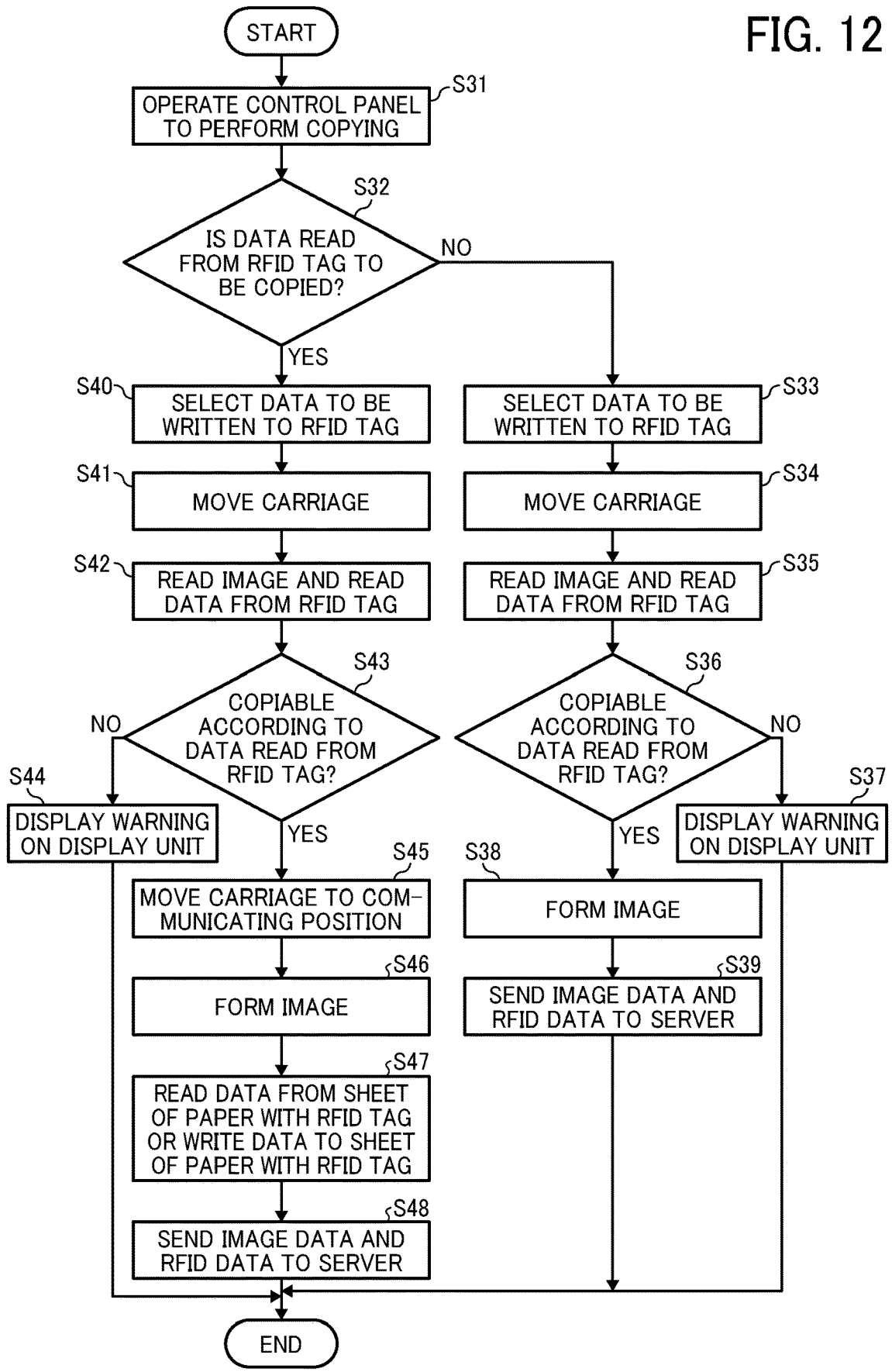
FIG. 12 is a flowchart of the copying operation using an image reading unit according to the first embodiment of the present disclosure.

FIG. 12 is a flowchart of copying operation using the image reading unit 200 shaped like a flat plate, according to the first embodiment of the present disclosure.

When the image on the document G provided with the RFID tag 300G is to be scanned and copied, firstly, in a step S31, a selection is made on the operation panel 510 of the image forming apparatus 1 to set, for example, the conditions for image reading or scanning. Subsequently, in a step S32, a selection is made on the operation panel 510 as to whether the data in the RFID tag 300G on the document G is to be copied together with the image on the document G.

When only the image on the document G is to be copied and the copying of the data in the RFID tag 300G on the document G is not selected ("NO" in the step S32) and some data is to be written to the RFID tag 300G on the document G, in a step S33, a selection is made as to what data is to be written. The data to be written may be, for example, the date and time information, the user data, and the data of security level. Then, in a step S34, the controller 500 moves the carriage 220. In a step S35, the controller 500 performs image reading operation to read the image on the document G placed on the contact glass 210 and performs data reading operation from the RFID tag 300G on the document G and data writing operation to the RFID tag 300G on the document G. When the controller 500 fails to read the data such as the ID data from the RFID tag 300G on the document G in the above step, the controller 500 causes the display unit 520 to display a warning message as described above.

Subsequently, in a step S36, the controller 500 determines whether the copying of the image on the document G is allowed or prohibited, based on the data such as the data of security level read from the RFID tag 300G on the document G. When it is determined that the copying is prohibited in the above step ("NO" in the step S36), in a step S37, for example, the controller 500 causes the display unit 520 to display a warning message saying "COPYING IS NOT ALLOWED FOR SECURITY REASONS", and terminates the copying operation.

On the other hand, when it is determined that the copying is allowed in the above step ("YES" in the step S36), in a step S38, the controller 500 performs image-forming operation to cause the image forming device 100 to form the image read from the document G on the sheet of paper P. Subsequently, in a step S39, the controller 500 causes the communication unit 530 to transmit the data read from the RFID tag 300G, the data written to the RFID tag 300G, the image data read from the document G, and the image data formed on the sheet of paper P.

When the copying of the data in the RFID tag 300G on the document G is selected ("YES" in the step S32) and some data is to be written to the RFID tag 300G on the document G, in a step S40, a selection is made as to what data is to be written. The data to be written may be, for example, the date and time information, the user data, and the data of security level. Then, in a step S41, the controller 500 moves the carriage 220. In a step S42, the controller 500 performs image reading operation to read the image on the document G placed on the contact glass 210 and performs data reading operation from the RFID tag 300G on the document G and data writing operation to the RFID tag 300G on the document G. When the controller 500 fails to read the data such as the ID data from the RFID tag 300G on the document G in the above step, the controller 500 causes the display unit 520 to display a warning message as described above.

Subsequently, in a step S43, the controller 500 determines whether the copying of the image on the document G is allowed or prohibited, based on the data such as the data of security level read from the RFID tag 300G on the document G. When it is determined that the copying is prohibited in the above step ("NO" in the step S43), in a step S44, for example, the controller 500 causes the display unit 520 to display a warning message saying "COPYING IS NOT ALLOWED FOR SECURITY REASONS", and terminates the copying operation.

On the other hand, when it is determined that the copying is allowed in the above step ("YES" in the S43), in a step S45, the controller 500 controls the carriage movement controller 240 to move the carriage 220 to the communicating position at which the short-range radio communication is performed with the RFID tag 300P on the sheet of paper P, and such a communicating position includes the position at which the carriage 220 is indicated by a solid line in FIG. 1 and the position at which the carriage 220 is indicated by a virtual line in FIG. 4. Subsequently, in a step S46, the controller 500 performs image-forming operation to cause the image forming device 100 to form the image read from the document G on the sheet of paper P.

Subsequently, when the sheet of paper P on which an image has been formed is ejected to the upper output tray 50B, in a step S47, the controller 500 according to the above embodiments of the present disclosure controls the RFID reader and writer 400 to perform the data reading operation from the RFID tag 300P on the sheet of paper P and the data writing operation to the RFID tag 300P on the sheet of paper P, or performs the data writing operation of the data read from the RFID tag 300G on the document G.

Subsequently, in a step S48, the controller 500 causes the communication unit 530 to transmit the data read from the RFID tag 300G or the RFID tag 300P, the data written to the RFID tag 300G or the RFID tag 300P, the image data read from the document G, and the image data formed on the sheet of paper P.

Figure 13:
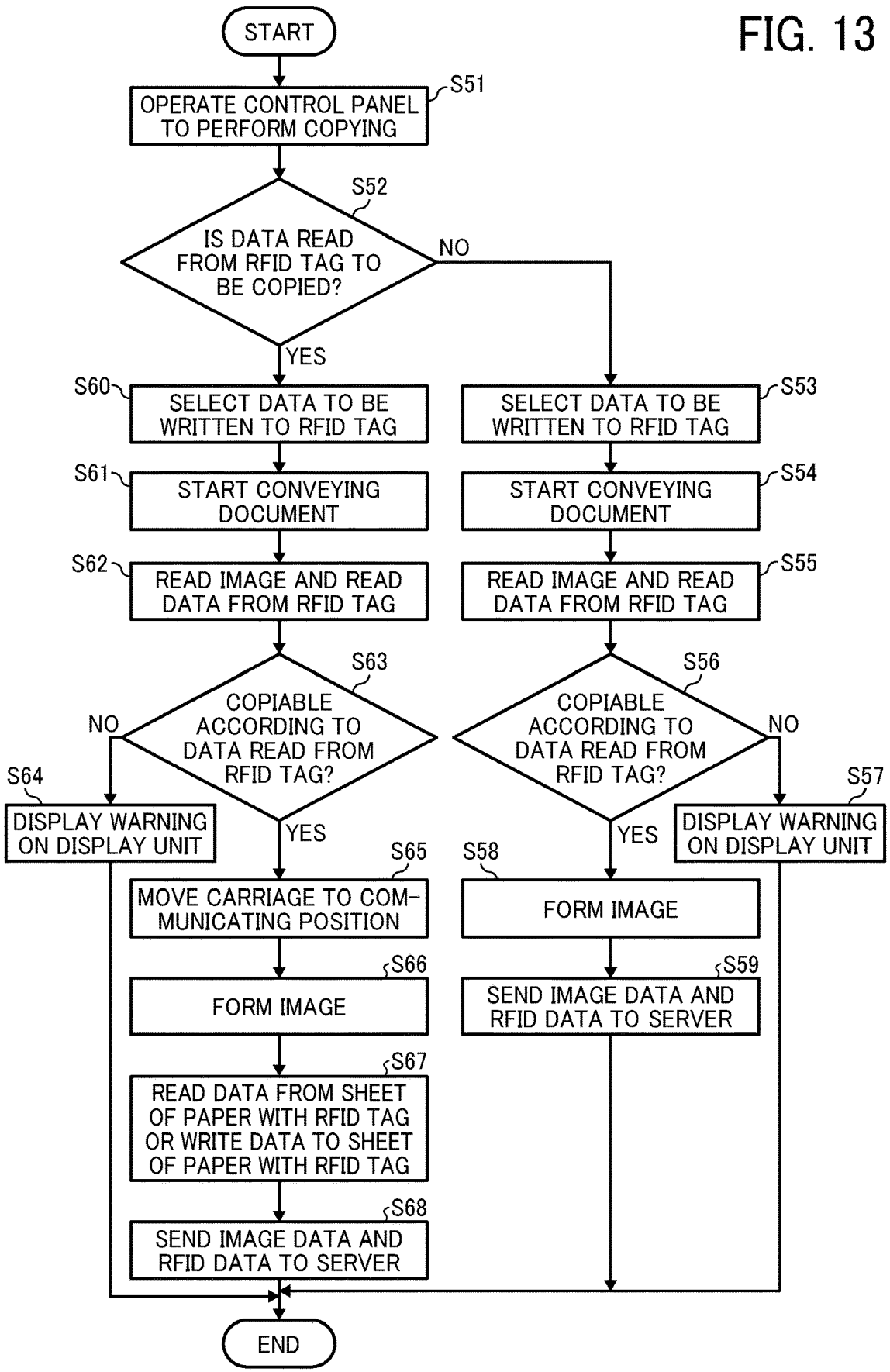
FIG. 13 is a flowchart of the copying operation using an image reading unit according to the second embodiment of the present disclosure.

FIG. 13 is a flowchart of copying operation using the image reading unit 200 of sheet through type, according to the second embodiment of the present disclosure.

When the image on the document G provided with the RFID tag 300G is to be scanned and copied, firstly, in a step S51, a selection is made on the operation panel 510 of the image forming apparatus 1 to set, for example, the conditions for image reading or scanning. Subsequently, in a step S52, a selection is made on the operation panel 510 as to whether the data in the RFID tag 300G on the document G is to be copied together with the image on the document G.

When only the image on the document G is to be copied and the copying of the data in the RFID tag 300G on the document G is not selected ("NO" in the step S52) and some data is to be written to the RFID tag 300G on the document G, in a step S53, a selection is made as to what data is to be written. The data to be written may be, for example, the date and time information, the user data, and the data of security level. Then, in a step S54, the controller 500 causes the ADF 600 to convey the document G. In a step S55, the controller 500 performs image reading operation to read the image on the conveyed document G, and performs the data reading operation from the RFID tag 300G on the document G and the data writing operation to the RFID tag 300G on the document G. When the controller 500 fails to read the data such as the ID data from the RFID tag 300G on the document G in the above step, the controller 500 causes the display unit 520 to display a warning message as described above.

Subsequently, in a step S56, the controller 500 determines whether the copying of the image on the document G is allowed or prohibited, based on the data such as the data of security level read from the RFID tag 300G on the document G. When it is determined that the copying is prohibited in the above step ("NO" in the step S56), in a step S57, for example, the controller 500 causes the display unit 520 to display a warning message saying "COPYING IS NOT ALLOWED FOR SECURITY REASONS", and terminates the copying operation.

On the other hand, when it is determined that the copying is allowed in the above step ("YES" in the step S56), in a step S58, the controller 500 performs image-forming operation to cause the image forming device 100 to form the image read from the document G on the sheet of paper P. Subsequently, in a step S59, the controller 500 causes the communication unit 530 to transmit the data read from the RFID tag 300G, the data written to the RFID tag 300G, the image data read from the document G, and the image data formed on the sheet of paper P.

When the copying of the data in the RFID tag 300G on the document G is selected ("YES" in the step S52) and some data is to be written to the RFID tag 300G on the document G, in a step S60, a selection is made as to what data is to be written. The data to be written may be, for example, the date and time information, the user data, and the data of security level. Then, in a step S61, the controller 500 causes the ADF 600 to convey the document G. In a step S62, the controller 500 performs image reading operation to read the image on the conveyed document G and performs data reading operation from the RFID tag 300G on the document G and data writing operation to the RFID tag 300G on the document G. When the controller 500 fails to read the data such as the ID data from the RFID tag 300G on the document Gin the above step, the controller 500 causes the display unit 520 to display a warning message as described above.

Subsequently, in a step S63, the controller 500 determines whether the copying of the image on the document G is allowed or prohibited, based on the data such as the data of security level read from the RFID tag 300G on the document G. When it is determined that the copying is prohibited in the above step ("NO" in the step S63), in a step S64, for example, the controller 500 causes the display unit 520 to display a warning message saying "COPYING IS NOT ALLOWED FOR SECURITY REASONS", and terminates the copying operation.

On the other hand, when it is determined that the copying is allowed in the above step ("YES" in the step S63), in a step S65, the controller 500 controls the carriage movement controller 240 to move the carriage 220 to the communicating position at which the short-range radio communication is performed with the RFID tag 300P on the sheet of paper P, and such a communicating position includes the position at which the carriage 220 is indicated by a solid line in FIG. 1 and the position at which the carriage 220 is indicated by a virtual line in FIG. 4. Subsequently, in a step S66, the controller 500 performs image-forming operation to cause the image forming device 100 to form the image read from the document G on the sheet of paper P.

Subsequently, when the sheet of paper P on which an image has been formed is ejected to the upper output tray 50B, in a step S67, the controller 500 according to the above embodiments of the present disclosure controls the RFID reader and writer 400 to perform the data reading operation from the RFID tag 300P on the sheet of paper P and the data writing operation to the RFID tag 300P on the sheet of paper P, or performs the data writing operation of the data read from the RFID tag 300G on the document G. Subsequently, in a step S68, the controller 500 causes the communication unit 530 to transmit the data read from the RFID tag 300G or the RFID tag 300P, the data written to the RFID tag 300G or the RFID tag 300P, the image data read from the document G, and the image data formed on the sheet of paper P.

In the above embodiments of the present disclosure, the communication mode that is used by the RFID readers and writers 400, 410, and 420 is fixed. However, the communication mode to be used may be selected from a plurality of communication modes such as a communication mode that uses a high-frequency (HF) radio or radar signal whose band of frequencies is high and a communication mode that uses an ultrahigh frequency (UHF) radio or radar signal whose band of frequencies is ultrahigh depending on, for example, the type or kind of the RFID tag 300G or the RFID tag 300P that serves as the counterpart of the short-range radio communication.

The embodiments described above are given as an example, and unique advantageous effects are achieved for each of the following modes given below.

First Mode

According to the first mode of the present disclosure, an image forming apparatus 1 includes an image reading unit 200 that reads an image formed on an object to be scanned such as a document G, an image forming device 100 that forms an image on a printing object such as a sheet of paper P, a first processing unit such as the controller 500 that performs short-range radio communication with an information storage unit such as the RFID tag 300G mounted on the object to be scanned to perform at least one of the data reading operation from the information storage unit and the data writing operation to the information storage unit, a second processing unit such as the controller 500 that performs short-range radio communication with the information storage unit such as the RFID tag 300P mounted on the printing object to perform at least one of the data reading operation from the information storage unit and the data writing operation to the information storage unit. In the present mode of the present disclosure, each one of the first processing unit and the second processing unit performs the short-range radio communication using the same antenna unit such as the RFID reader and writer 400.

According to the present mode, the antenna unit that is used to perform the short-range radio communication with the information storage unit of the object to be scanned is the same as the antenna unit that is used to perform the short-range radio communication with the information storage unit of the printing object. Due to such a configuration, for example, the number of components can be reduced, and the footprint can be reduced compared with a configuration or structure in which a plurality of antenna units are provided on an individual basis for each process.

In particular, in a configuration or structure in which a plurality of antenna units are provided on an individual basis for each process, there are many cases in which a member such as a radio shielding needs to be provided for each one of the antenna units so as to avoid jamming, interference, or the like between the short-range radio communication performed with the information storage unit of the object to be scanned by the first processing unit and the short-range radio communication performed with the information storage unit of the printing object by the second processing unit. According to the present mode, for example, the number of components can be reduced and the footprint can be reduced in regard to a member such as a radio shielding.

Second Mode

According to the second mode of the present disclosure, the image forming apparatus 1 according to the first mode of the present disclosure further includes a moving unit such as the carriage 220 that can move between a first communicating position at which the first processing unit performs the short-range radio communication and a second communicating position at which the second processing unit performs the short-range radio communication, and the antenna unit is mounted on the moving unit.

According to the present mode, each one of the first processing unit and the second processing unit can perform the short-range radio communication at an appropriate communicating position.

Third Mode

According to the third mode of the present disclosure, an image forming apparatus 1 includes an image reading unit 200 that reads an image formed on an object to be scanned such as a document G, an image forming device 100 that forms an image on a printing object such as a sheet of paper P, a first processing unit such as the controller 500 that performs short-range radio communication with an information storage unit such as the RFID tag 300G mounted on the object to be scanned to perform at least one of the data reading operation from the information storage unit and the data writing operation to the information storage unit, a second processing unit such as the controller 500 that performs short-range radio communication with the information storage unit such as the RFID tag 300P mounted on the printing object to perform at least one of the data reading operation from the information storage unit and the data writing operation to the information storage unit, and a moving unit such as the carriage 220 that can move between a first communicating position at which the first processing unit performs the short-range radio communication and a second communicating position at which the second processing unit performs the short-range radio communication. In the present mode of the present disclosure, a plurality of antenna units such as the RFID readers and writers 400, 410, and 420 that are used by the first processing unit and the second processing unit to perform the short-range radio communication are mounted on the moving unit.

In a configuration or structure in which a plurality of antenna units are disposed at different positions that are away from each other, there are many cases in which a member such as a radio shielding needs to be provided for each one of the antenna units so as to avoid jamming, interference, or the like between the short-range radio communication performed with the information storage unit of the object to be scanned by the first processing unit and the short-range radio communication performed with the information storage unit of the printing object by the second processing unit. According to the present mode, all the antenna units are mounted on the same moving unit, and for example, the number of components can be reduced and the footprint can be reduced in regard to a member such as a radio shielding.

What is more, according to the present mode, as the moving unit is moved, each one of the first processing unit and the second processing unit can perform the short-range radio communication at an appropriate communicating position.

Fourth Mode

According to the fourth mode of the present disclosure, in the image forming apparatus 1 according to the third mode of the present disclosure, the moving unit moves inside a shielding case 230 configured to block a radio wave of the short-range radio communication. Moreover, in the present mode of the present disclosure, the shielding case has a first aperture at a position corresponding to the first communicating position on, for example, the top surface of the shielding case 230, and has a second aperture, such as the aperture 232 on the bottom face of the shielding case 230, at a position corresponding to the second communicating position.

According to the present mode, erroneous data reading operation and data writing operation can be prevented between the information storage unit mounted on the object to be scanned and the information storage unit mounted on the printing object.

Fifth Mode

According to the fifth mode of the present disclosure, in the image forming apparatus 1 according to any one of the second mode to the fourth mode of the present disclosure, the image reading unit is provided with a moving scanner such as the carriage 220 configured to scan an image on the object to be scanned while moving along a mounting table such as the surface of the contact glass 210 on which the object to be scanned is placed, and the moving unit serves as the moving scanner.

According to the present mode, the moving scanner of a so-called flat-plate shaped image reading unit is used, and each one of the antenna units can be moved to an appropriate communicating position of the first processing unit and the second processing unit.

Sixth Mode

According to the sixth mode of the present disclosure, in the image forming apparatus 1 according to the fifth mode of the present disclosure, a range in which the antenna unit is able to perform communication in an direction perpendicular to directions in which the moving scanner moves is broader than a range in which the moving scanner is able to read an image in the direction perpendicular to the directions in which the moving scanner moves.

According to the present mode, the data reading operation or the data writing operation can be performed with the information storage unit regardless of the position of the object to be scanned at which the information storage unit is placed.

Seventh Mode

According to the seventh mode of the present disclosure, in the image forming apparatus 1 according to any one of the first mode to the sixth mode of the present disclosure, the antenna unit is disposed inside the shielding case such as the casing 450 that blocks the radio wave of the short-range radio communication, and the shielding case has the first aperture 451 at a position corresponding to a first communicating position at which the first processing unit performs the short-range radio communication. Moreover, according to the seventh mode of the present disclosure, the shielding case has the second aperture 453 at a position corresponding to a second communicating position at which the second processing unit performs the short-range radio communication, and an openable and closable lid 452 or an openable and closable lid 454 that absorbs or reflects the radio wave of the short-range radio communication is provided for at least one of the first aperture and the second aperture.

According to the present mode, erroneous data reading operation and data writing operation can be prevented between the information storage unit mounted on the object to be scanned and the information storage unit mounted on the printing object.

Eighth Mode

According to the eighth mode of the present disclosure, in the image forming apparatus 1 according to any one of the first mode to the seventh mode of the present disclosure, the image reading unit is disposed on an upper portion of the image forming device, and the antenna unit performs the short-range radio communication below the objects to be scanned, and performs the short-range radio communication above the printing object.

According to the present mode, in the image forming apparatus in which the image reading unit is disposed above the image forming device, each one of the first processing unit and the second processing unit can easily perform the short-range radio communication at an appropriate communicating position.

Ninth Mode

According to the ninth mode of the present disclosure, in the image forming apparatus 1 according to the eighth mode of the present disclosure, the image forming device is provided with a plurality of sheet ejection units, such as the lower output tray 50A and the upper output tray 50B to which a printing object on which the image has been formed are ejected, in an upper portion of the image forming device, and the second processing unit is configured to perform at least one of the data reading operation from the information storage unit mounted on the printing object that is ejected to the topmost one of the multiple sheet ejection units such as the upper output tray 50B and the data writing operation to the information storage unit provided for the printing object that is ejected to the topmost one of the multiple sheet ejection units such as the upper output tray 50B.

According to the present mode, the short-range radio communication can be performed at a position close to the printing object that is ejected to one of the sheet ejection units.

Tenth Mode

According to the tenth mode of the present disclosure, in the image forming apparatus 1 according to any one of the first mode to the ninth mode of the present disclosure, the image reading unit includes a stationary scanner such as the carriage 220 configured to scan an image on the object to be scanned while the object to be scanned is being conveyed, and the antenna unit is mounted on the stationary scanner.

According to the present mode, for example, the number of components can be reduced, and the footprint can be reduced in the image forming apparatus provided with an image reading unit of so-called sheet-through type.

Eleventh Mode

According to the eleventh mode of the present disclosure, in the image forming apparatus 1 according to any one of the first mode to the tenth mode of the present disclosure, an output power of the antenna unit when the first processing unit performs the short-range radio communication is different from an output power of the antenna unit when the second processing unit performs the short-range radio communication.

According to the present mode, each one of the first processing unit and the second processing unit can perform the short-range radio communication in an appropriate communication range.

Twelfth Mode

According to the twelfth mode of the present disclosure, in the image forming apparatus 1 according to any one of the first mode to the eleventh mode of the present disclosure, at least one of the first processing unit and the second processing unit selects one of a plurality of different communication modes, such as a communication mode that uses a high-frequency (HF) radio or radar signal whose band of frequencies is high and a communication mode that uses an ultrahigh frequency (UHF) radio or radar signal whose band of frequencies is ultrahigh, to perform the short-range radio communication.

According to the present mode, the data reading operation or the data writing operation can be performed upon selecting an appropriate communication mode depending on the type or kind of the information storage unit that serves as the counterpart of the short-range radio communication, and the number of types of the information storage units can be increased.

Thirteenth Mode

According to the thirteenth mode of the present disclosure, in the image forming apparatus 1 according to any one of the first mode to the twelfth mode of the present disclosure, the communication mode that the first processing unit uses to perform the short-range radio communication is different from the communication mode that the second processing unit uses to perform the short-range radio communication.

According to the present mode, each one of the first processing unit and the second processing unit can perform the short-range radio communication using a different communication mode.

Note that numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

What is claimed is:

1. An image forming apparatus comprising:
   a scanner configured to read an image formed on an object to be scanned, wherein the scanner is configured to obtain the image of the object to be scanned and to read data stored in a first radio frequency identification (RFID) tag mounted on the object to be scanned in a one-time scanning of the object to be scanned;
   an image forming device configured to form an image on a printing object;
   a controller configured to perform a first short-range radio communication to perform at least one of a first data reading operation from the first RFID tag and a first data writing operation to the first RFID tag, and to perform a second short-range radio communication with a second RFID tag mounted on the printing object to perform at least one of a second data reading operation from the second RFID tag and a second data writing operation to the second RFID tag,
   wherein the controller is configured to perform the first short-range radio communication and the second short-range radio communication using a same antenna.

2. The image forming apparatus according to claim 1, further comprising:
   a carriage configured to be movable between a first communicating position at which the controller performs the first short-range radio communication and a second communicating position at which the controller performs the second short-range radio communication,
   wherein the antenna unit is mounted on the carriage.

3. An image forming apparatus comprising:
   a scanner configured to read an image formed on an object to be scanned, wherein the scanner is configured to obtain the image of the object to be scanned and to read data stored in a first radio frequency identification (RFID) tag mounted on the object to be scanned in a one-time scanning of the object to be scanned;

an image forming device configured to form an image on a printing object;

a controller configured to perform a first short-range radio communication to perform at least one of a first data reading operation from the first RFID tag and a first data writing operation to the first RFID tag, and to perform a second short-range radio communication with a second RFID tag mounted on the printing object to perform at least one of a second data reading operation from the second RFID tag and a second data writing operation to the second RFID tag;

a carriage configured to be movable between a first communicating position at which the controller performs the first short-range radio communication and a second communicating position at which the controller performs the second short-range radio communication; and a plurality of antennas mounted on the carriage, the antennas being used by the controller to perform the first and second short-range radio communication.

4. The image forming apparatus according to claim 3, further comprising:

a shielding case configured to block a radio wave of the short-range radio communication, wherein the carriage is configured to move inside the shielding case, wherein the shielding case has a first aperture at a position corresponding to the first communicating position, and wherein the shielding case has a second aperture at a position corresponding to the second communicating position.

5. The image forming apparatus according to claim 2, wherein the scanner includes a moving scanner configured to scan the image on the object to be scanned while moving along a mounting table on which the object to be scanned is placed, and wherein the carriage serves as the moving scanner.

6. The image forming apparatus according to claim 5, wherein a range in which the antenna is able to perform communication in a direction perpendicular to directions in which the moving scanner moves is broader than a range in which the moving scanner is able to read an image in the direction perpendicular to the directions in which the moving scanner moves.

7. The image forming apparatus according to claim 1, wherein the antenna is disposed inside a shielding case configured to block a radio wave of the short-range radio communication, wherein the shielding case has a first aperture at a position corresponding to a first communicating position at which the controller performs the first short-range radio communication, wherein the shielding case has a second aperture at a position corresponding to a second communicating position at which the controller performs the second short-range radio communication, and wherein at least one of the first aperture and the second aperture has an openable and closable lid configured to absorb or reflect a radio wave of the short-range radio communication.

8. The image forming apparatus according to claim 1, wherein the scanner is disposed above the image forming device, and wherein the antenna is configured to perform the short-range radio communication below the object to be scanned, and is configured to perform the short-range radio communication above the printing object.

9. The image forming apparatus according to claim 8, wherein the image forming device includes, in an upper portion of the image forming device, a plurality of sheet ejection units to which a printing object on which the image has been formed are ejected, and wherein the controller is configured to perform at least one of the second data reading operation from the second RFID tag of the printing object ejected to a topmost one of the plurality of sheet ejection units and the second data writing operation to the second RFID of the printing object ejected to the topmost one of the plurality of sheet ejection units.

10. The image forming apparatus according to claim 1, wherein the scanner comprises a stationary scanner configured to scan the image on the object to be scanned while the object to be scanned is being conveyed, and wherein the antenna is mounted on the stationary scanner.

11. The image forming apparatus according to claim 1, wherein an output power of the antenna when the controller performs the first short-range radio communication while the carriage is in a first communicating position is different from an output power of the antenna when the controller performs the second short-range radio communication while the carriage is in a second communicating position.

12. The image forming apparatus according to claim 1, wherein the controller is configured to select one of a plurality of different communication modes to perform the short-range radio communication.

13. The image forming apparatus according to claim 1, wherein a communication mode that the controller uses to perform the first short-range radio communication while the carriage is in a first communicating position is different from a communication mode that the controller uses to perform the second short-range radio communication while the carriage is in a second communicating position.

* * * * *